US010893582B1

(12) United States Patent
Watkins

(10) Patent No.: US 10,893,582 B1
(45) Date of Patent: Jan. 12, 2021

(54) BIODEGRADABLE MICROWAVE SUSCEPTOR

(71) Applicant: Inline Packaging, LLC, Princeton, MN (US)

(72) Inventor: Jeffrey T. Watkins, Princeton, MN (US)

(73) Assignee: Inline Packaging, LLC, Princeton, MN (US)

( * ) Notice: Subject to any disclaimer, the term of this patent is extended or adjusted under 35 U.S.C. 154(b) by 0 days.

(21) Appl. No.: 16/839,804

(22) Filed: Apr. 3, 2020

(51) Int. Cl.
*H05B 6/64* (2006.01)
*B65D 81/34* (2006.01)

(52) U.S. Cl.
CPC ....... *H05B 6/6494* (2013.01); *B65D 81/3446* (2013.01); *H05B 6/6408* (2013.01); *B65D 2581/3466* (2013.01)

(58) Field of Classification Search
CPC ...... H05B 6/6494; H05B 6/6491; H05B 6/80; H05B 6/6408; B65D 81/3446; B65D 2581/3466
See application file for complete search history.

(56) References Cited

U.S. PATENT DOCUMENTS

| | | | |
|---|---|---|---|
| 4,948,932 A | 8/1990 | Clough | |
| 5,038,009 A | 8/1991 | Babbitt | |
| 6,320,172 B1 | 11/2001 | Watkins | |
| D477,156 S | 7/2003 | Watkins | |
| 6,586,715 B2 | 7/2003 | Watkins | |
| 6,870,145 B2 | 3/2005 | Watkins | |
| 6,906,299 B2 | 6/2005 | Watkins | |
| 6,946,082 B1 | 9/2005 | Watkins | |
| 7,022,955 B2 | 4/2006 | Watkins | |
| 7,525,075 B1 | 4/2009 | Watkins | |
| 7,578,236 B2 | 8/2009 | Watkins | |
| 7,807,950 B2 | 10/2010 | Watkins | |
| 8,314,373 B1 | 11/2012 | Watkins | |
| 8,492,690 B1 * | 7/2013 | Watkins | ............... H05B 6/6408 219/678 |
| 2002/0043532 A1 | 4/2002 | Watkins | |
| 2003/0080121 A1 | 5/2003 | Watkins | |
| 2003/0206997 A1 | 11/2003 | Winkelman | |
| 2004/0023000 A1 | 2/2004 | Young | |
| 2004/0089656 A1 | 5/2004 | Watkins | |

(Continued)

FOREIGN PATENT DOCUMENTS

| | | |
|---|---|---|
| GB | 2365000 | 2/2002 |
| JP | 2002-347756 | 12/2002 |
| JP | 2003-63565 | 3/2003 |

OTHER PUBLICATIONS http://www.futamuragroup.com/en/divisions/cellulose-films/products/cellophane/; Futamura Cellophane Webpage; Feb. 23, 2020.

(Continued)

*Primary Examiner* — Brian W Jennison
(74) *Attorney, Agent, or Firm* — Neustel Law Offices

(57) ABSTRACT

A biodegradable microwave susceptor and constructs incorporating the susceptor are disclosed for heating a food item in a microwave oven. The biodegradable microwave susceptor includes a patterned susceptor layer of metal on a biodegradable substrate. Selected areas of the susceptor layer may be demetallized to remove susceptor material. The susceptor may be incorporated into a construct for containing or supporting a food item to be heated.

20 Claims, 22 Drawing Sheets

(56) References Cited

U.S. PATENT DOCUMENTS

| | | |
|---|---|---|
| 2004/0101605 A1 | 5/2004 | Sigel |
| 2005/0006383 A1 | 1/2005 | Watkins |
| 2005/0252609 A1 | 11/2005 | Watkins |
| 2006/0000828 A1 | 1/2006 | Watkins |
| 2006/0049190 A1* | 3/2006 | Middleton ........... B65D 81/264 219/730 |
| 2008/0135544 A1* | 6/2008 | Lafferty ............. B65D 81/3858 219/730 |
| 2016/0044749 A1 | 2/2016 | Li |

OTHER PUBLICATIONS https://www.transcendia.com/sites/default/files/datasheet_download/Transcenda_Technical_Datasheet_NVS-F%20White.pdf; Transcendia NatureFlex NVS-F Data Sheet; 2016.

https://www.transcendia.com/sites/default/files/sellsheet_download/Transcendia_TransCello-NatureFlex_Sellsheet.pdf; Transcendia Trancello & NatureFlex Films Sell Sheet; 2016.

\* cited by examiner

BIODEGRADABLE MICROWAVE SUSCEPTOR

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to various blanks, constructs and methods for heating, browning and/or crisping a food item, and more specifically to a biodegradable microwave susceptor for use with various blanks, constructs and methods for heating, browning and/or crisping a food item in a microwave oven.

Related Art

Any discussion of the related art throughout the specification should in no way be considered as an admission that such related art is widely known or forms part of common general knowledge in the field.

Microwave susceptors and constructs containing microwave susceptors for heating food items in microwave ovens have been in use for years. Conventional microwave susceptors function by absorbing microwave energy and converting it to heat at the susceptor surface to heat a food item. Known susceptors heat food items by conduction and/or infrared radiation. Conduction heating tends to occur when there is good thermal contact between the surface of a susceptor and a food item. Infrared heating tends to occur when there is an air gap between the surface of a susceptor and a food item.

Microwave susceptors have been constructed as laminate structures including, for example, a metal or metallized film layer or a carbonized ink layer, i.e., a susceptor layer, on or sandwiched between one or more other layers. Susceptor layers have been formed using a variety of processes, including spray coating, vacuum deposition, and direct printing on a substrate. Materials used for substrates have included thermoplastic polymers such as polyethylene terephthalate (also known as PET or polyester), various other polyesters, and the like. See, for example, U.S. Pat. No. 5,038,009 and published U.S. Application No. US 2016/0044749 A1.

Microwave susceptors have been incorporated in a variety of constructs such as food packages for microwave heating. Prior constructs incorporating microwave susceptors have comprised one or more layers of cellulose-based material, such as paperboard, cardboard or the like. See, for example, constructs disclosed in U.S. Pat. Nos. 8,492,690; 8,314,373; 7,807,950; and 7,525,075 by the inventor of the present invention.

One problem with prior microwave susceptors and constructs is that the polymer-based materials that have been used as susceptor substrates are neither biodegradable nor compostable. As such, they are not environmentally friendly, are difficult and expensive to properly dispose of, and can contribute to non-biodegradable pollution in public landfills and, worse, waterways, parklands, and elsewhere. Another problem with prior microwave susceptors and constructs is consumer perception of potential health issues regarding polymer-based materials of the susceptors coming in contact with food items being heated.

What is needed is a microwave susceptor that is biodegradable and environmentally friendly and that avoids health concerns related to contact between thermoplastic polymer materials and food items.

SUMMARY

Example embodiments are directed to a biodegradable microwave susceptor and to constructs including such a susceptor for heating food items in a microwave oven. The biodegradable microwave susceptor generally comprises a microwave susceptor layer and a biodegradable substrate arranged in the form of a laminate.

The susceptor layer includes a pattern of microwave interactive material, e.g., metallized material, corresponding to a pattern of heat desired to be applied to a particular food item. The pattern of heat to be applied to the food item may be customized based on the type of food item (e.g. shape, size, temperature, internal contents, food product type, desired browning and crisping of the food product). In an embodiment, the susceptor layer comprises a pattern of microwave interactive material that includes first and second patterns of different sizes with the first and second patterns being selectively located at first and second areas of the susceptor layer corresponding with first and second portions of a food item to which heat is to be applied. In an embodiment, the susceptor layer includes at least one microwave inactive area that is devoid of microwave interactive material, e.g., is demetallized.

The biodegradable substrate of the susceptor is arranged on a side of the susceptor layer that is exposed to the food item to which heat is to be applied. The biodegradable substrate may be in contact with the food item in one or more areas where the microwave interactive material and microwave inactive areas of the susceptor layer are located.

One embodiment of a construct including a biodegradable microwave susceptor according to the invention has a plurality of panels, e.g., top, bottom, and side panels, that are arranged to define a space for a food item. Each panel has a first surface, e.g., an inner surface, that is exposed to the space, and a second surface, e.g., an outer surface, that is exposed to an exterior of the package. In one arrangement, two side panels connect longitudinal edges of top and bottom panels to form an open-ended sleeve defining a space for containing a food item. In another arrangement, two side panels connect longitudinal edges of a bottom panel to form a tray type structure with an open top.

A biodegradable microwave susceptor according to the invention is included on the surface of one or more of the panels that are exposed to the space for the food item. The space is configured so that at least one selected portion of the food item may be in contact with the biodegradable substrate in an area where microwave interactive material or a microwave inactive area of the susceptor layer is present. The construct also may include at least one fold area to facilitate construction, e.g., a fold area between adjacent panels, and the susceptor layer may include at least one microwave inactive area corresponding to the fold area.

Another embodiment of a construct including a biodegradable microwave susceptor according to the invention comprises a substantially flat panel having a surface for a food item to at least partially rest on. A biodegradable microwave susceptor according to the invention is included on the surface.

There has thus been outlined, rather broadly, some of the features of the biodegradable microwave susceptor and constructs incorporating the susceptor in order that the detailed description thereof may be better understood, and in order that the present contribution to the art may be better appreciated. Additional features of the biodegradable microwave susceptor will be described hereinafter and will form the subject matter of the claims appended hereto. In this respect, before explaining at least one embodiment of the biodegradable microwave susceptor in detail, it is to be understood that the biodegradable microwave susceptor is not limited in its application to the details of construction or to the arrangements of the components set forth in the following description or illustrated in the drawings. The biodegradable microwave susceptor is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Unless otherwise specified, to the extent used herein, relative positional and orientational terms such as top, bottom, upper, lower, left side, right side, and the like as applied to elements and components of the example embodiments described herein are not intended to be limiting but are used merely for convenience of description and to distinguish among the various elements and components. Persons of ordinary skill in the art will appreciate that the example embodiments described herein and others can be implemented with a variety of different orientations and positions without deviating from the broad concepts embodied therein. Thus, as just one example, those skilled in the art will understand that a reference to a "top" panel of an example embodiment does not necessarily mean that the example embodiment must always be oriented so that the panel is on "top" but is only used to distinguish the panel from other panels, such as another panel referred as a "bottom" panel. Those skilled in the art will understand that in the same example embodiment simply rotated by 180 degrees, the relative positions and orientations of the panels may be reversed but the panels and the described embodiment otherwise remain unchanged.

A. Overview.

Figure 10:
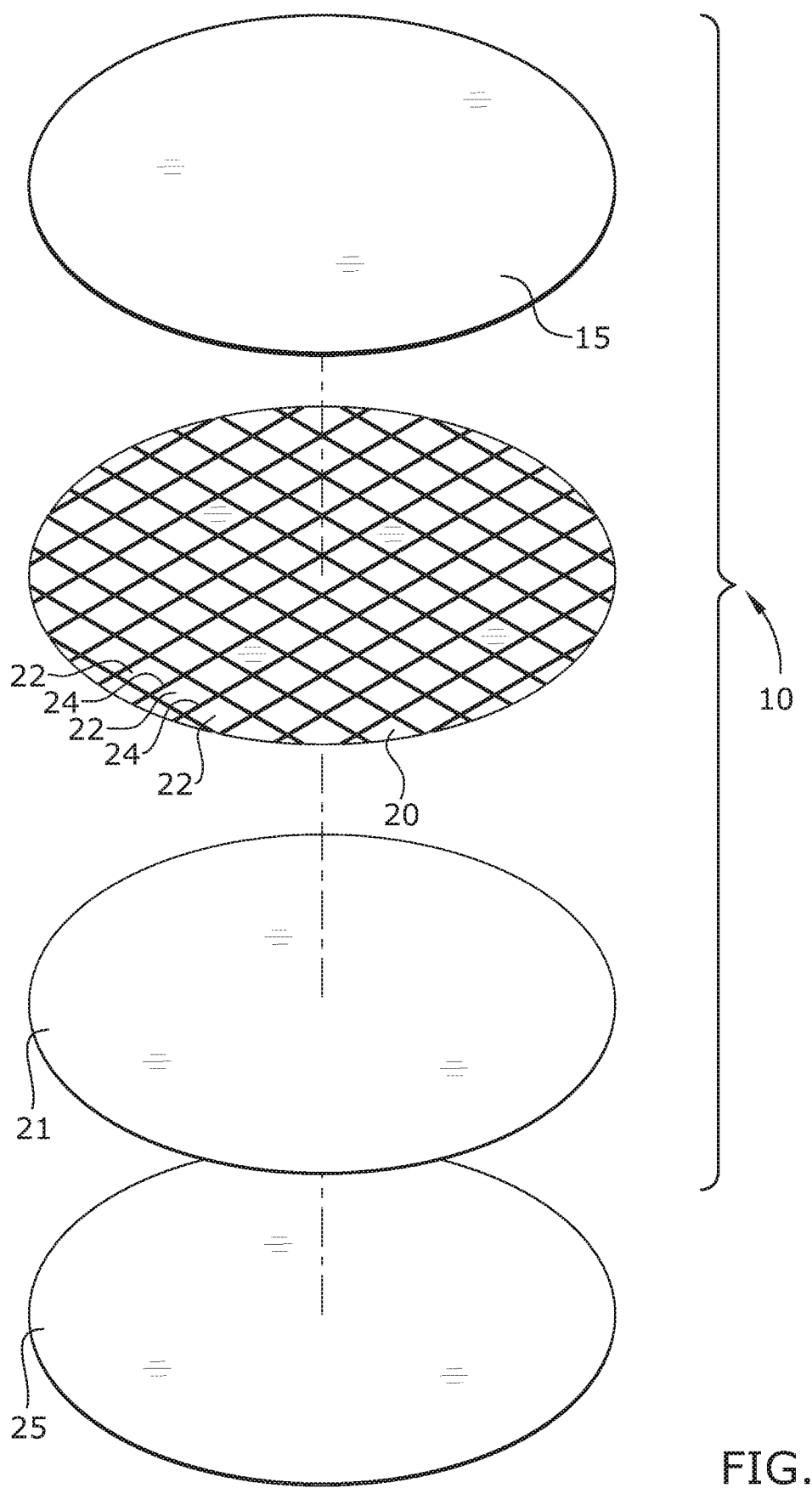
FIG. 10 is an exploded perspective view of a biodegradable microwave susceptor and a flat panel blank in accordance with another example embodiment.
Figure 11:
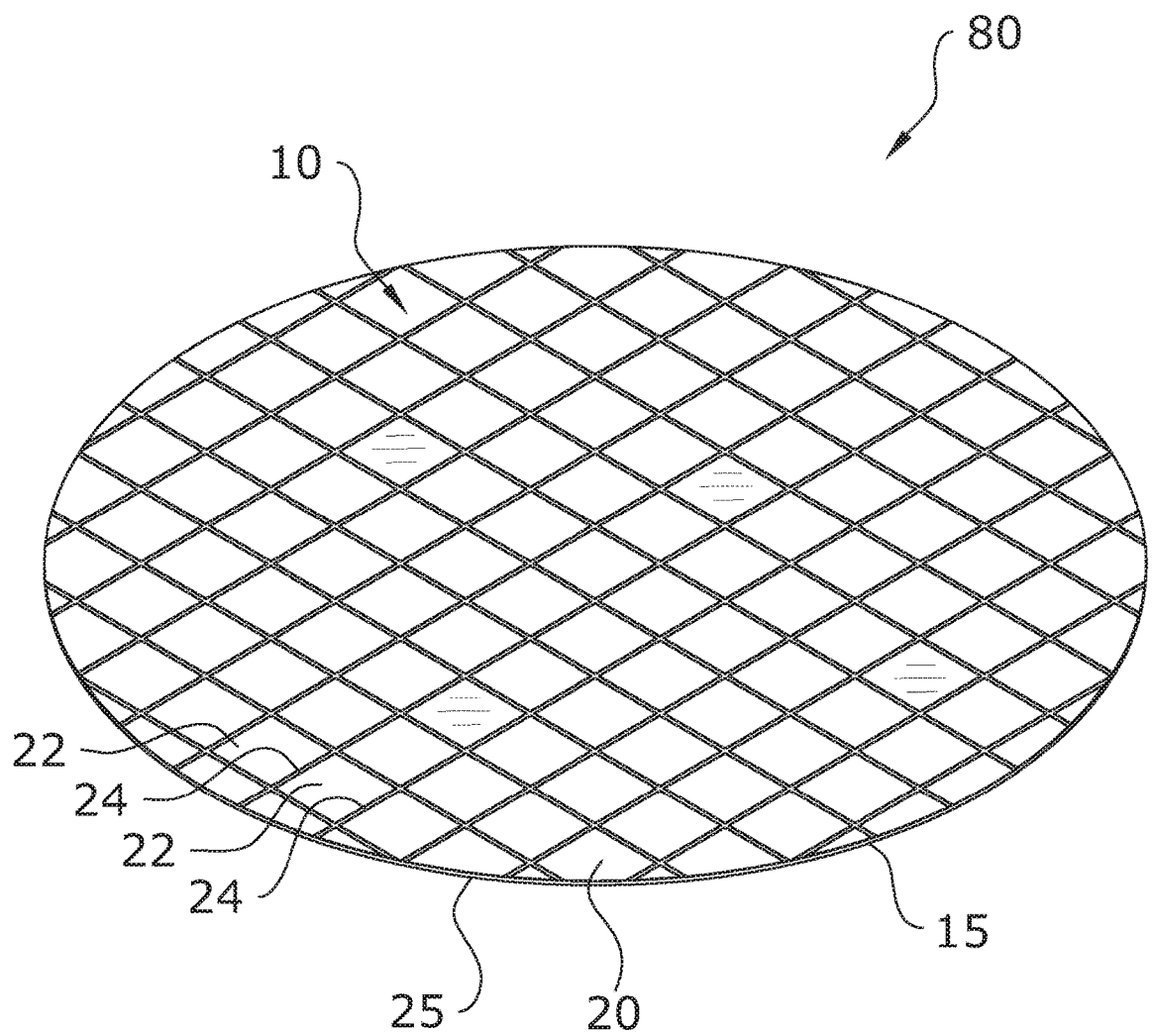
FIG. 11 is a top view of a biodegradable microwave susceptor laminated with the flat panel blank of FIG. 10 to form a construct in accordance with another example embodiment.

FIGS. 1A-9 illustrate various views of an example biodegradable microwave susceptor 10 and package or construct 50 incorporating the susceptor for containing a food item to be heated in a microwave oven. FIGS. 12A-21D illustrate various views of an example biodegradable microwave susceptor 10 as incorporated in a number of variations of the package or construct 50. FIGS. 10 and 11 illustrate another example embodiment of a package 80 incorporating an example biodegradable microwave susceptor 10 for a food item to rest on at least partially to be heated in a microwave oven.

As shown in FIGS. 1A-3 and 10-11, an example biodegradable microwave susceptor 10 embodying features of the invention generally comprises a biodegradable substrate 15, a susceptor layer 20, and an interface layer 21. The biodegradable substrate 15, susceptor layer 20, and interface layer 21 are arranged in the form of a laminate with the susceptor layer 20 lying between the biodegradable substrate 15 and the interface layer 21.

The susceptor layer 20 may have one or more areas of microwave interactive material 22 and one or more microwave inactive areas 24. An area of microwave interactive material 22 may comprise one or more patterns of microwave interactive material 22, e.g., metallized material, corresponding to a pattern or patterns of heat to be applied to a particular food item. A microwave inactive area 24 is devoid of microwave interactive material, e.g., is demetallized. Other microwave inactive areas 26, 28, 30, 32, 34, 36, 38, 40, 44 can be located in areas where it is desired not to apply heat to a food item and in areas where folds or overlaps are to be made to form a construct.

The biodegradable substrate 15 comprises a biodegradable cellulosic material, preferably a cellophane film. The biodegradable substrate 15 is arranged on a side of the susceptor layer 20 that is to be exposed to a food item to apply heat. The biodegradable substrate 15 may be in contact with the food item in one or more locations where microwave interactive material 22 and microwave inactive areas 24 of the susceptor layer 20 are present in order to distribute the heat to the food item as desired.

The interface layer 21 is arranged on a side of the susceptor layer 20 that is opposite to the biodegradable substrate 15. To incorporate the susceptor 10 into a construct, such as example constructs 50, 80, the interface layer 21 can be adhered to a flat panel 25 of paperboard or the like comprising part or all of a blank for forming the construct, thus forming a substantially flat laminate sheet comprising the susceptor 10 and panel 25 as best shown in FIGS. 1A-3 and 10-11. Depending on the intended configuration of the construct incorporating the susceptor 10, the laminate sheet may be provided with various features such as fold areas 48 to enable the sheet to be folded or otherwise formed into the desired configuration, as shown and described with respect to FIGS. 3-9 and 12A-21D. Alternatively, if desired based on the nature and shape of a food item to be heated, the laminate sheet may be retained as a substantially flat panel as shown in FIGS. 10-11 on which a food item can at least partially rest for heating.

B. Biodegradable Substrate.

The biodegradable substrate 15 of the example biodegradable microwave susceptor 10 preferably is arranged to cover substantially the entire surface of the susceptor layer 20 on the side of the susceptor layer 20 that is exposed to a food item to which heat is to be applied. The biodegradable substrate 15 preferably comprises a thin film of a biodegradable cellulose-based material or biodegradable polyester, most preferably a cellulose material such as cellophane.

Both metallized and non-metallized cellophane films suitable for use as the biodegradable substrate 15 are commercially available from various sources. One suitable biodegradable cellophane film is manufactured by Futamura Chemical UK Ltd. in the United Kingdom and is sold under the brand name NATUREFLEX® NVS.

Cellulose-based materials, including cellophane, are manufactured from natural wood fiber and are biodegradable, compostable, and recyclable. This is a major advantage over the thermoplastic polymer materials such as PET and other forms of polyester that have been used previously as substrates for microwave susceptors. Another advantage is that natural cellulose-based materials do not raise the perceived health concerns among consumers that thermoplastic polymer materials do concerning their contact with food items, especially under the extreme temperature conditions of microwave cooking.

As a cellulose product, cellophane has additional properties that are desirable for providing excellent microwave cooking results. In particular, it is capable of generating very high levels of heat as a susceptor substrate without breaking down. This feature can be used to provide improved cooking results essentially limited only by the ability of a food item being cooked to absorb the generated heat. However, while cellophane constitutes a presently preferred material for its desirable properties, it should be understood that other biodegradable high temperature films with similar properties could also be used.

While cellophane's properties make it desirable for use as the biodegradable substrate 15 for the susceptor layer 20, it also has other less favorable attributes that the example embodiments address. For example, unlike PET and other thermoplastic polymer films, cellophane is a non-extensible film. When stressed, it tears like paper rather than stretching. Cellophane also burns like paper under extreme temperature conditions. Thus, a fully metallized cellophane-based susceptor lamination could generate excessive heat and result in scorching or burning of the lamination and construct materials when subjected to microwave heating. In contrast, the thermoplastic polymer films tend to crack or "craze" when subjected to high temperatures. This property acts like a thermostat for a susceptor because as the film surface breaks up, it produces less heat. As a result, the risk of scorching, staining, or charring of the laminate and the construct materials is reduced, as is the risk of ignition.

In addition, cellophane tends to shrink when it is heated. Thus, when areas of microwave interactive material 22 of the susceptor layer 20 are present in the fold 48 and/or overlap areas of a blank from which a construct is formed and the construct is subjected to microwave heating, the heat emitted from the areas of microwave interactive material in those areas can cause the cellophane in those areas to overheat, shrink, and delaminate from the susceptor layer 15 and the underlying construct panel or blank 25. However, it has been discovered that these effects can be prevented by locating microwave inactive areas such as areas 26, 28, 30, 34, 36, 38, and 44 in the fold 48 and overlap areas of the laminate comprising the microwave susceptor 10 and construct panel or blank 25. For example, this can be accomplished through the use of selective demetallization of the susceptor layer 20 in those areas, as described in more detail below, which effectively controls the temperatures generated in those areas. Alternatively, a reduction of the layer of metal or other film used as a microwave interactive material may also prevent excessive heating of the biodegradable substrate 15 in those areas.

C. Susceptor Layer.

The susceptor layer 20 of the example biodegradable microwave susceptor 10 may be comprised of any type of microwave interactive material or materials that absorb electromagnetic energy from microwaves and convert the same to heat for application to a food item. The susceptor layer 20 is preferably comprised of a suitable metal and more preferably of aluminum. However, various other types of microwave interactive materials may be used including but not limited to ceramics and other materials that have been used previously to construct microwave susceptors.

A metal such as aluminum is particularly preferred for use as a microwave interactive material because of the ease and precision with which it can be manipulated to form defined areas of microwave interactive material 22 and microwave inactive areas 24 of the susceptor layer 20 on the biodegradable substrate 15 in desired locations and with desired patterns. As described above, metallized cellophane films are commercially available from various sources including Futamura Chemical UK Ltd. in the United Kingdom under the brand name NATUREFLEX® NVS. The metallization layer on these films is suitable for use to construct the susceptor layer 20. Alternatively, a conventional thin film vacuum metallization process can be used to initially metallize a surface of the biodegradable substrate 15.

Preferably, the susceptor layer 20 is processed according to the demetallization apparatus and process disclosed in U.S. Pat. No. 6,946,082 to define the areas of microwave interactive material 22 and microwave inactive areas 24 of the susceptor layer 20 on the biodegradable substrate 15 in desired locations and with desired patterns. U.S. Pat. No. 6,946,082 is incorporated herein as if set forth in its entirety. The commercially available films identified above are suitable for use with the apparatus and process of U.S. Pat. No. 6,946,082 to construct the susceptor layer 20.

Although other apparatus and methods for processing the susceptor layer 20 to define and pattern selected areas of microwave interactive material 22 and microwave inactive areas 24 devoid of such material will be known to those skilled in the art and could be used if desired, the apparatus and methods described in U.S. Pat. No. 6,946,082 are preferred. Among other things, the process of U.S. Pat. No. 6,946,082 requires a minimal number of steps and provides a simple, rapid, and cost effective means for producing high quality, selectively demetallized microwave susceptor films and microwave susceptor/package laminates.

Figure 1A:
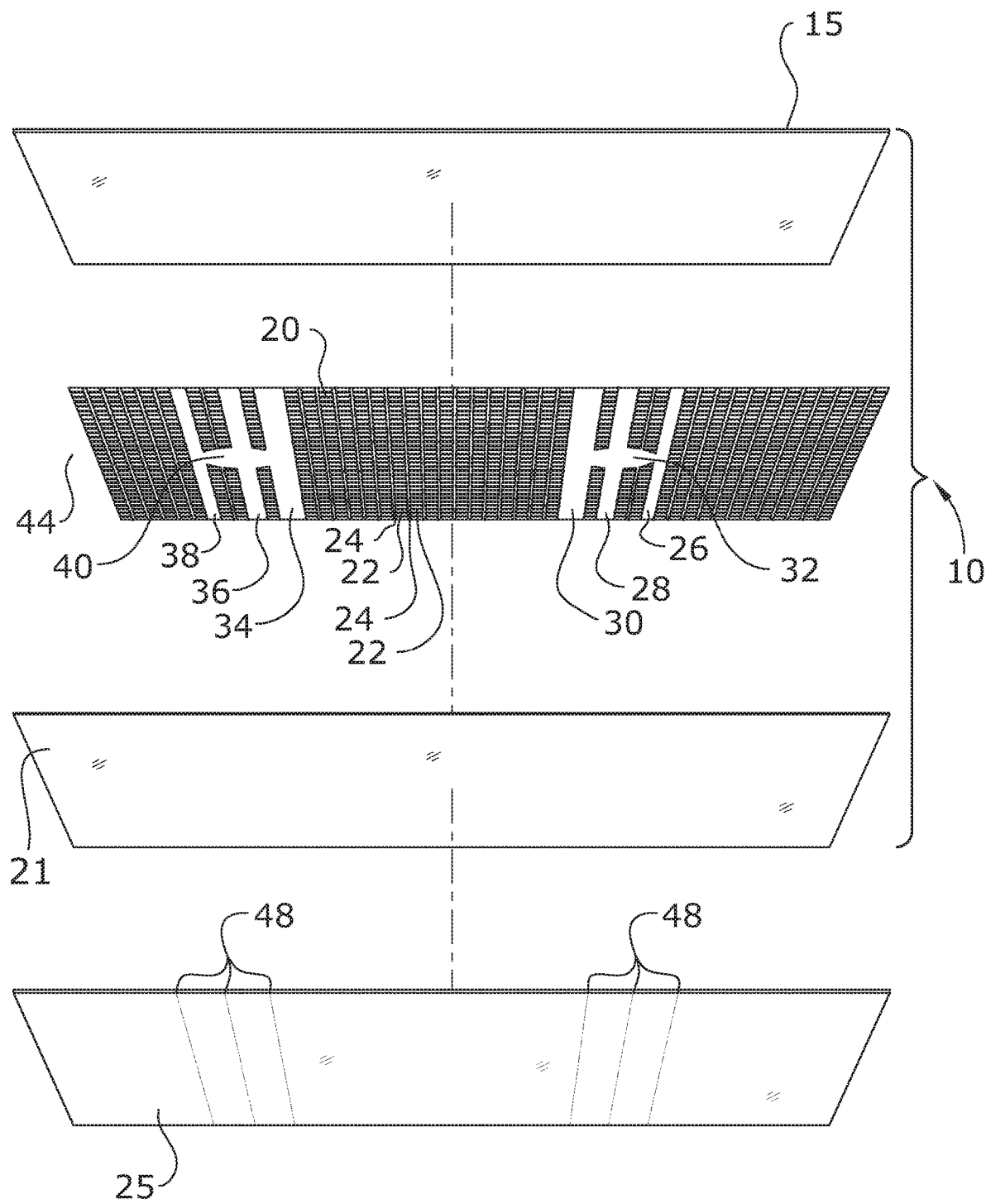
FIG. 1A is an exploded perspective view of a biodegradable microwave susceptor and a panel in accordance with an example embodiment.
Figure 1B:
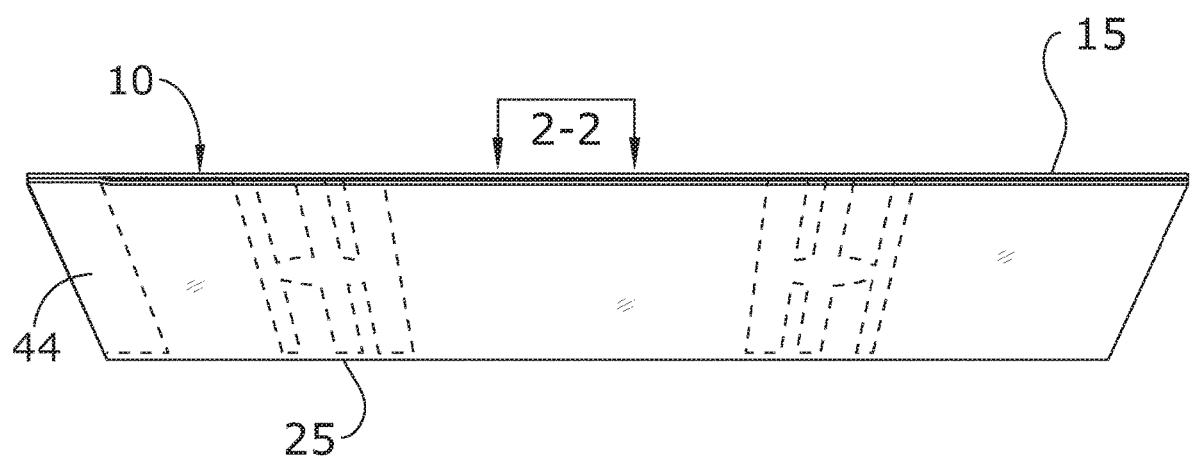
FIG. 1B is a perspective view of a biodegradable microwave susceptor laminated with a panel in accordance with an example embodiment.
Figure 3:
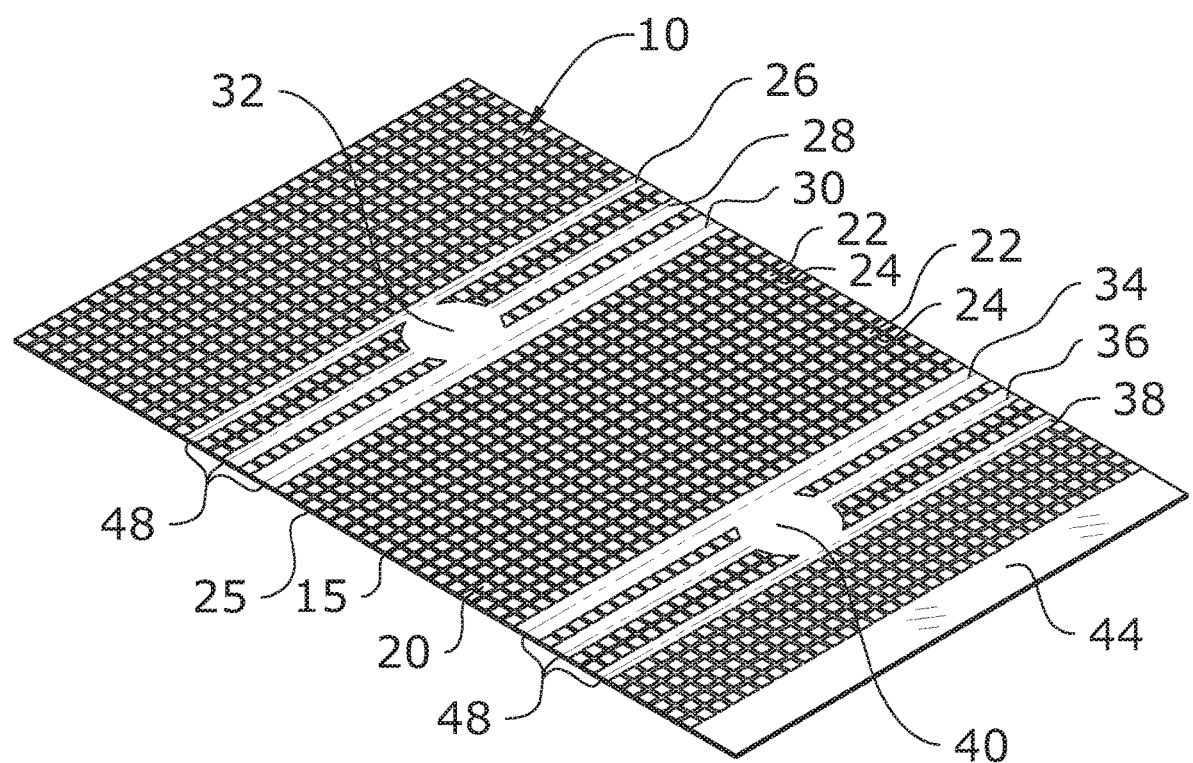
FIG. 3 is a perspective view of a biodegradable microwave susceptor laminated with a blank for a construct in accordance with an example embodiment.
Figure 5:
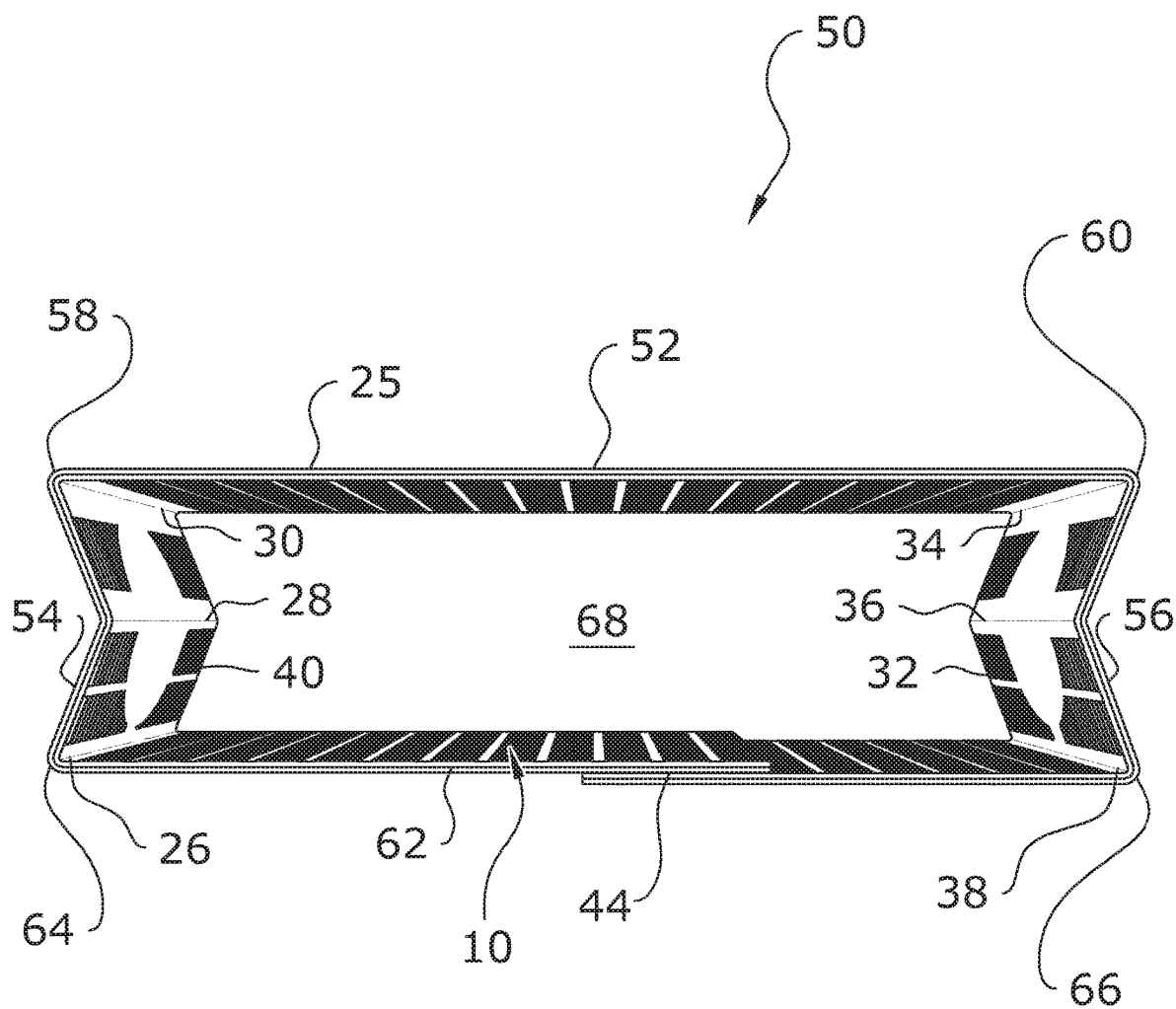
FIG. 5 is an end view of a construct from the blank of FIG. 3 incorporating a biodegradable microwave susceptor in accordance with an example embodiment.

FIGS. 1A, 3, and 5 among others illustrate one embodiment where the susceptor layer 20 is formed and arranged to have a plurality of different areas where each area has a substantially uniform pattern of microwave interactive material 22 comprised of a plurality of individual areas of microwave interactive material 22 isolated from each other by a plurality of microwave inactive areas 24. More specifically, in each area the individual areas of microwave interactive material 22 are substantially uniform square-shaped areas arranged in a substantially symmetrical array and separated by substantially uniform and symmetrical narrow linear microwave inactive areas 24. However, those skilled in the art will understand that many pattern variations are possible depending on the configuration of the construct into which the susceptor 10 is to be integrated, the type and shape of the food item to be heated, the levels and locations of heat to be applied to various portions of the food item, the type of heating to be accomplished, e.g., conduction or infrared, and other considerations.

For example, the individual areas of microwave interactive material 22 may be shaped as squares, rectangles, circles, triangles, or other regular or irregular geometric shapes. Moreover, the individual areas of microwave interactive material 22 need not all have the same shape but may include a mix of a plurality of different shapes. Similarly, the individual areas of microwave interactive material 22 need not all be the same size, and instead the individual areas of microwave interactive material 22 may have a plurality of different sizes. In the example embodiments illustrated in FIGS. 12A-21D for instance the individual areas of microwave interactive material 22 comprise a mix of square and rectangular shapes of different sizes. Similarly, the microwave inactive areas 24 also may have various uniform or different shapes and sizes and need not be arranged uniformly or symmetrically.

Further, the same pattern of microwave interactive material 22 and microwave inactive areas 24 may extend over the entire susceptor layer 20 or a plurality of different patterns may be present in a plurality of different areas of the susceptor layer 20. For example, the surface of one panel of a construct, such as a surface of a top or bottom panel, may correspond to one area of the susceptor layer 20 and may have one pattern while the surface of another panel, for example a side panel, may comprise another area of the susceptor layer 20 and may have a different pattern.

Still further, a plurality of different patterns may be present in a plurality of different areas of the susceptor layer 20 corresponding to different areas or portions of a food item to be heated. For example, one area of susceptor layer 20 corresponding to one portion of a food item to be heated may have one pattern and a second area of susceptor layer 20 corresponding to a second portion of the food item may comprise a second pattern. Even further, when the susceptor layer 20 comprises a plurality of patterns, each pattern may comprise different sized, shaped, and arranged individual areas of microwave interactive material 22 and microwave inactive areas 24.

In this way, a substantial amount of control is gained over the levels, locations, and types of heating to facilitate achieving optimal cooking results. For example, the sizes, shapes, and arrangement of the individual areas of microwave interactive material 22 making up a first pattern may be selected to direct selected levels of infrared heating to selected surface areas of a food item that are not in contact with the susceptor 10 but that are exposed to an area of the susceptor 10 where the first pattern is present. At the same time, different sizes, shapes, and arrangements of the individual areas of microwave interactive material 22 making up a second pattern may be selected to direct selected level of conduction heating to other selected areas or portions of the food item that are in contact with an area of the susceptor 10 where the second pattern is present. Alternatively, the sizes, shapes, and arrangements of the individual areas of microwave interactive material 22 making up a first pattern may be selected to direct a selected level of conduction heating to a selected area or portion of a food item in contact with an area of the susceptor 10 where the first pattern is present, while the sizes, shapes, and arrangements of the individual areas of microwave interactive material 22 making up a second pattern are selected to direct another selected level of conduction heating to another selected area or portion of the food item in contact with another area of the susceptor 10 where the second pattern is present.

Further, referring primarily to FIG. 3, the pattern or patterns of microwave interactive material 22 of susceptor layer 20 may be interrupted by microwave inactive areas formed in other selected locations of the susceptor layer 20. A number of such microwave inactive areas 26, 28, 30, 32, 34, 36, 38, and 40 are illustrated in FIG. 3 in connection with the laminate comprising the biodegradable microwave susceptor 10 and a construct panel or blank 25.

For example, microwave inactive areas 32 and 40 may be selectively formed in the pattern of microwave interactive material 22 in locations where it desired to form openings in the construct to vent heat or gases as the food item is heated, or in areas where increased microwave passage is desirable to help heat the interior of the food item. Also for example and as described above, microwave inactive areas 26, 28, 30, 34, 36, 38, and 44 may be selectively formed in locations where the pattern of microwave interactive material 22 coincide with or correspond to designated fold 48 or overlap areas of the laminate. These areas are provided to facilitate forming a construct incorporating the susceptor 10. However, as described previously, removal of the microwave interactive material 22 in such areas is effective to prevent potential overheating of the biodegradable substrate 15 of the susceptor 10 and possible delamination in those areas. Alternatives to complete removal of the microwave interactive material may include reduction of the layer of metal or other film used as the microwave interactive material in those areas.

D. Interface Layer.

The interface layer 21 of the example biodegradable microwave susceptor 10 preferably is arranged to cover substantially the entire surface of the susceptor layer 20 on the side of the susceptor layer 20 that is opposite to the biodegradable substrate 15. The interface layer 21 is preferably comprised of a material that is biodegradable and that can be readily adhered to the susceptor layer 20 on one side and a panel or blank 25 for a construct on the other side. The interface layer 21 preferably comprises a biodegradable material, which may be for example a suitable cellulose-based material such as paper or paper-containing material.

Figure 2:
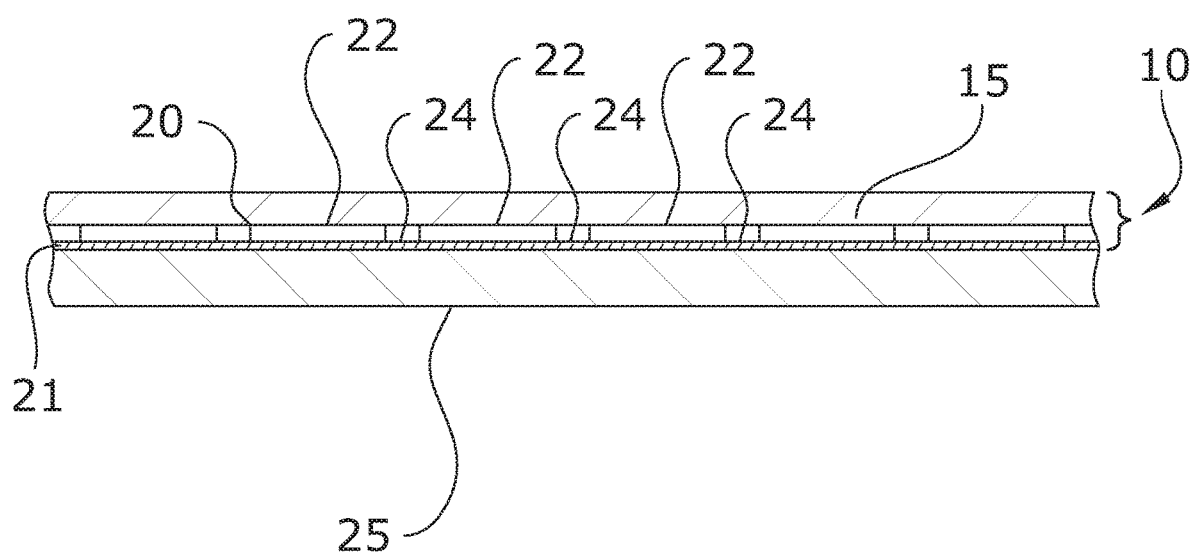
FIG. 2 is an enlarged cross-sectional view of a portion of the biodegradable microwave susceptor laminated with the panel of FIG. 1B taken along lines 2-2.

The interface layer 21 can be adhered to the susceptor layer 20 and to the panel or blank 25 for a construct using an adhesive that is safe for use around food items and that has suitable adherence and thermal properties when exposed to microwave heating. The biodegradable microwave susceptor 10 comprising the laminate of biodegradable substrate 15, susceptor layer 20, and interface layer 21 is preferably adhered to a panel or blank 25 for a construct via the interface layer 21 according to the apparatus and method of U.S. Pat. No. 6,946,082 in order to construct the laminate of the biodegradable microwave susceptor 10 and construct panel or blank 25 as shown in FIG. 2. The panel or blank 25 preferably comprises a cellulose-based material such as paper, paperboard, or a similar material suitable for use with the apparatus and method of U.S. Pat. No. 6,946,082 and such material is available from commercial sources.

E. Constructs Incorporating Biodegradable Microwave Susceptor.

Turning now to a description of constructs incorporating the biodegradable microwave susceptor 10, FIGS. 4-9 illustrate an example embodiment of a construct 50. Construct 50 is formed from a substantially flat laminate of the biodegradable microwave susceptor 10 and the blank 25 shown in FIG. 3. The laminate is shaped and sized to form the construct 50 with an intended size and configuration. The laminate may be provided with selected fold 48 and overlap areas to facilitate formation of the construct in the desired configuration. As described above, microwave interactive material may be removed from the fold 48 and overlap areas so that they comprise microwave inactive areas 26, 28, 30, 34, 36, 38, 44. To facilitate partial or complete folding of the laminate in the identified areas, one or more perforations, creases, or the like may be provided in the fold areas 48.

In one approach, the example construct 50 may be formed from the flat laminate shown in FIG. 3 by folding the laminate in fold areas 30, 34 toward each other by approximately 90 degrees so that the patterns of areas of microwave interactive material 22 on the surfaces of the folded sections face toward each other. Next, the laminate is folded in fold areas 26 and 38 by approximately 90 degrees so that the patterns of areas of microwave interactive material 22 on the surfaces of the folded sections face downwardly and inwardly and the overlap area of one folded section overlaps and overlies a corresponding portion of the surface of the other folded section that faces outwardly. The overlap area can be permanently attached to the outwardly facing surface of the other folded section using a suitable adhesive. Finally, the laminate may be slightly or partially folded in fold areas 28 and 36 to create a slight indent or crease as illustrated in FIGS. 4-6.

As formed, construct 50 is generally comprised of a first panel 52, a second panel 62, a third panel 54, and a fourth panel 56. The panels 50, 52, 54, and 56 are arranged and interconnected to define a space 68 for a food item. Each of the panels 50, 52, 54, and 56 has a surface exposed to the space 68. The biodegradable microwave susceptor 10 is preferably present on at least one of the surfaces of the panels 50, 52, 54, and 56 exposed to the space 68 and preferably all of them. Accordingly, one or more areas or portions of a food item in the space 68 may be exposed to and may be in contact with one or more areas of the biodegradable microwave susceptor 10. More specifically, one or more areas or portions of the food item may be exposed to and may be in contact with the biodegradable substrate 15 of the susceptor 10 in one or more locations where one or more areas of microwave interactive material 22 and one or more microwave inactive areas 24 of the susceptor layer 20 are present.

Figure 4:
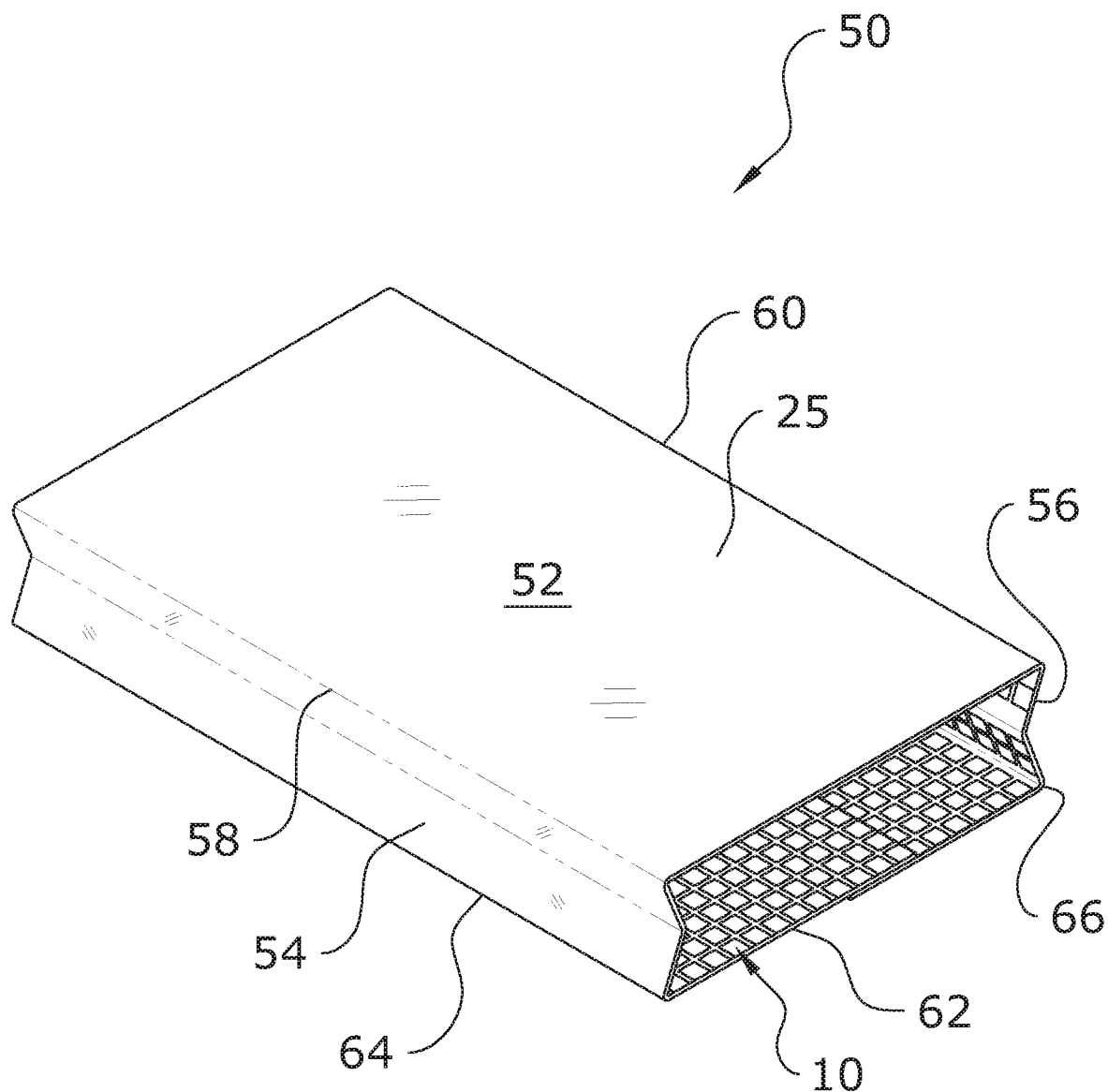
FIG. 4 is an upper perspective view of a construct from the blank of FIG. 3 incorporating a biodegradable microwave susceptor in accordance with an example embodiment.
Figure 6:
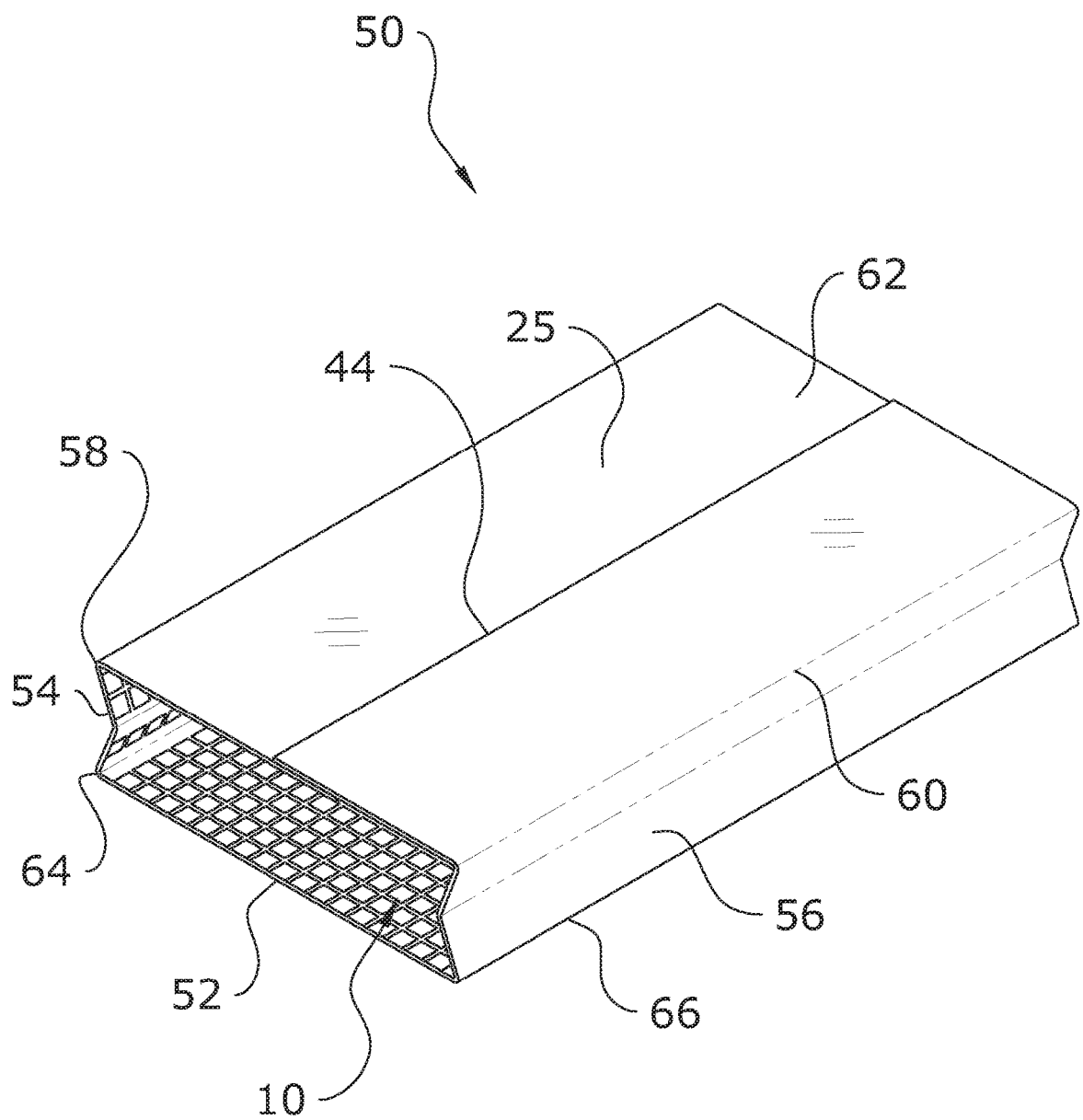
FIG. 6 is lower perspective view of a construct from the blank of FIG. 3 incorporating the biodegradable microwave susceptor in accordance with an example embodiment.
Figure 7:
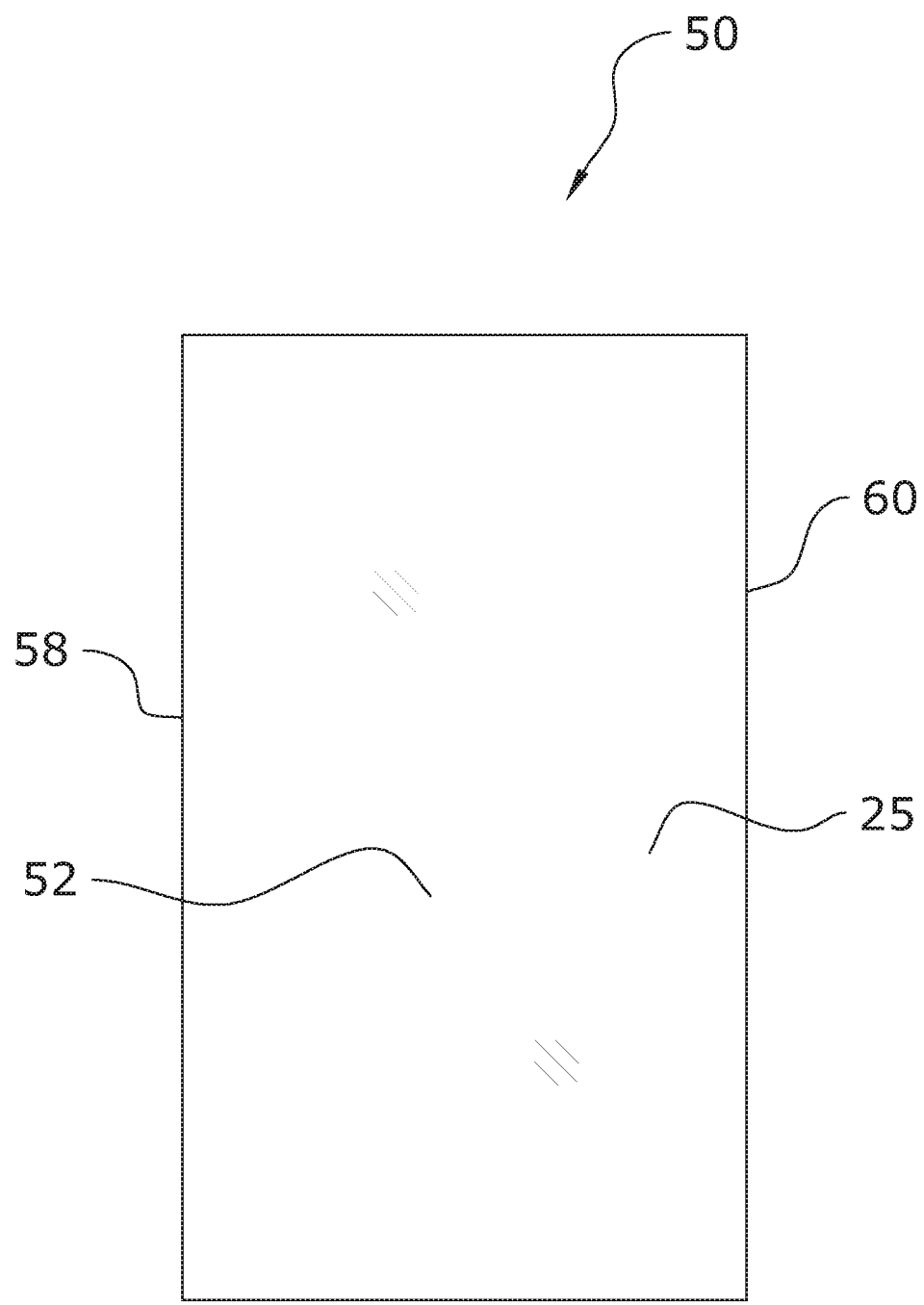
FIG. 7 is a top view of a construct from the blank of FIG. 3 incorporating the biodegradable microwave susceptor in accordance with an example embodiment.
Figure 8:
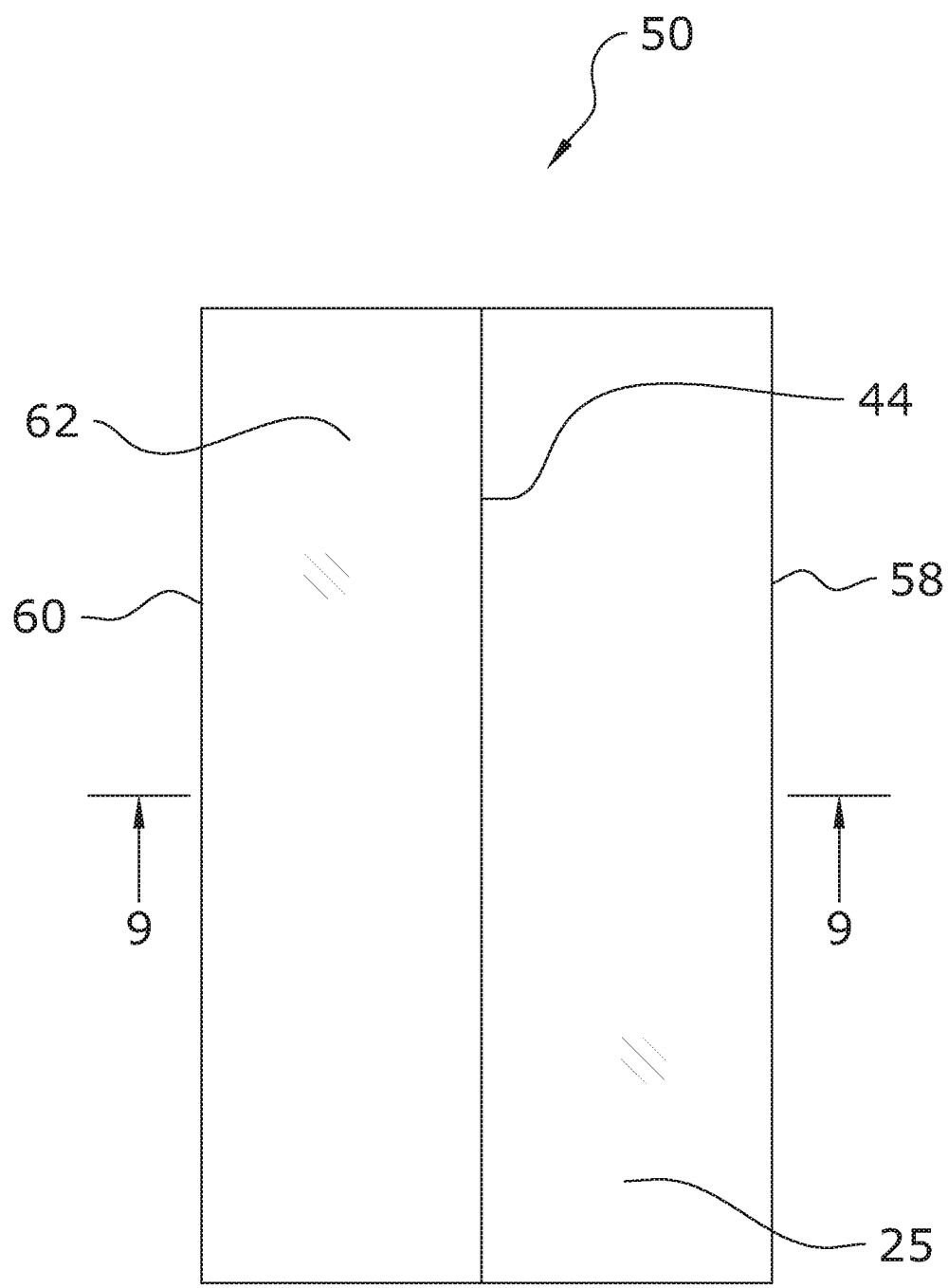
FIG. 8 is a bottom view of a construct from the blank of FIG. 3 incorporating the biodegradable microwave susceptor in accordance with an example embodiment.
Figure 9:
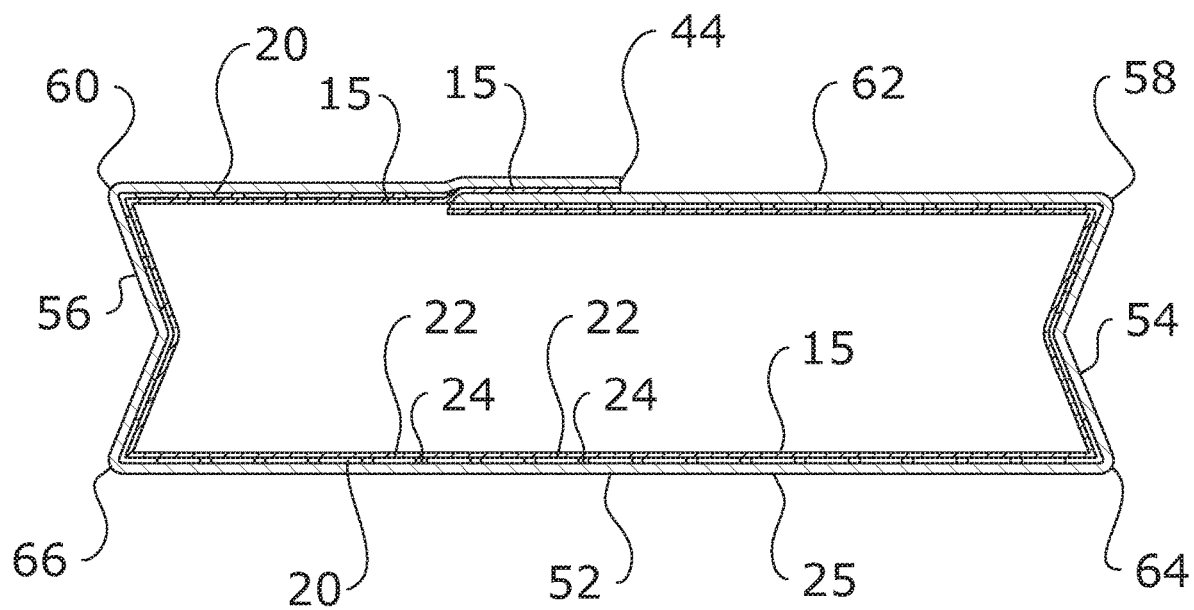
FIG. 9 is a cross-sectional end view of the construct of FIG. 8 taken along section line 9-9.

More specifically, the example construct 50 has the form of an elongated open-ended sleeve as shown in FIGS. 4-6 and others. Alternatively, the laminate from which the construct 50 is formed, may include additional panels and fold areas so that one or both ends of the construct 50 may be selectively opened and closed, for example by a foldable end flap or end panel.

The sleeve of construct 50 is comprised of a substantially flat elongated top panel 52 having an inner surface and an outer surface with substantially parallel longitudinal edges 58 and 60, an opposing substantially flat elongated bottom panel 62 having inner and outer surfaces with substantially parallel longitudinal edges 64 and 66, and opposing side panels 54 and 56 each having inner and outer surfaces. Side panel 54 connects the longitudinal edges 58 and 64 of the top and bottom panels respectively, and side panel 56 connects the longitudinal edges 60 and 66 of the top and bottom panels respectively, thereby forming an elongated open-ended sleeve with an interior space 68, which is configured to contain a food item to be heated in a microwave oven.

The biodegradable microwave susceptor 10 is present on one or more and preferably all of the inner surfaces of each of the top, bottom, and side panels 52, 54, 56, 62, with patterns of microwave interactive material 22 being present on the inner surfaces except where the patterns are interrupted by microwave inactive areas. For example, as previously described and as shown in FIGS. 3, 5, and others microwave inactive areas 26, 30, 34 and 38 can be seen on the inner surfaces of the side panels 54 and 56 in the fold areas 48 where the side panels 54, 56 connect to the respective longitudinal edges 58, 60, 64, and 66 of the top and bottom panels 52, 62. Microwave inactive areas 32 and 40 also can be seen on the inner surfaces of the side panels 54 and 56 overlapping microwave inactive areas 28 and 36 respectively where an inward indent or crease in the side panels 54 and 56 may bring the biodegradable microwave susceptor 10 into contact with a food item in the interior space 68 of the construct 50

It will be appreciated that numerous other construct configurations, including those shown and described in U.S. Pat. Nos. 8,492,690; 8,314,373; 7,807,950; and 7,525,075 by the inventor of the present invention are possible, are suitable for use with the biodegradable microwave susceptor 10, and are incorporated herein to that extent. Still other possible construct configurations in which the biodegradable microwave susceptor 10 is suitable for use are shown and described in Japanese Pub. No. JP2002-347756 to Kato, Japanese Pub. No. JP2003-63565 to Kato, U.S. Pub. No. 2004/0023000 to Young, U.S. Pub. No. 2003/0206997 to Winkelman, U.S. Pub. No. 2004/0101605 to Sigel, U.S. Pat. No. 4,948,932 to Clough and UK Patent Pub. GB2365000 to Somers, which also are incorporated herein to that extent.

FIGS. 10-11 illustrate another example construct 80 incorporating biodegradable microwave susceptor 10. No folds or overlaps are required to form construct 80. Rather the completed construct retains the substantially flat form of the laminate of the biodegradable microwave susceptor 10 and panel 25 shown in exploded form in FIG. 10 and laminated in FIG. 11. Construct 80 provides a substantially flat surface that incorporates the biodegradable microwave susceptor 10 and that a food item can be placed on and can rest on at least partially as heat is applied to the food item in a microwave. The food item to be heated is preferably placed directly on the surface incorporating the susceptor 10 but may also be supported by a platform or the like in close proximity to the surface. Construct 80 is thus well-suited for heating relatively thin and flat food items, such as pizzas. Construct 80 may have its periphery formed approximately in the shape of the food item to be heated if desired. Although illustrated as a substantially circular shape, it will be readily appreciated that any other shape could also be used.

It will also be appreciated that the pattern or patterns of microwave interactive material areas 22 and microwave inactive areas 24 of the susceptor layer 20 shown in FIGS. 10-11 may be varied as desired or necessary in the same way as described previously. Similarly, the shapes, spacing, and arrangement of the microwave interactive material areas 22 and microwave inactive areas 24 may be varied as desired or necessary in the same manner as described previously. It further will be appreciated that, while not shown in FIGS. 10-11, other microwave inactive areas could be formed in selected locations of the susceptor layer 20 as needed or desired also as previously described.

F. Additional Alternative Embodiments.

FIGS. 12A through 21D illustrate various alternative embodiments of a variation of the construct 50 that does not have a top panel 52 and instead is open at the top in a tray type of structure having a U-shaped cross sectional shape defining an interior space for receiving the food item to be heated in a microwave. One or both of the ends of the construct 50 shown in FIGS. 12A through 21D may also be open or closed similar to the prior discussed embodiments. It is preferable that the side panels 54, 56 of the embodiments of the package 50 shown in FIGS. 12A through 21D do not include any microwave interactive material because the side panels 54, 56 are typically not in contact with the food during heating in a microwave and the side panels 54, 56 will not get hot so a consumer can grasp the side panels 54, 56 easily and comfortably.

FIGS. 12A through 21D illustrate various embodiments having a pair of side panels 54, 56 extending longitudinally along and upwardly from the sides of the bottom panel 62. The embodiment shown in FIG. 21A illustrates the side panels 54, 56 each having an upper straight edge with two opposing slanted ends. The embodiments shown in FIGS. 13A and 18A illustrate the side panels 54, 56 each having upper straight edges extending horizontally and straight vertical opposing ends. The embodiments shown in FIGS. 12A, 14A, 15A, 16A, 17A, 19A and 20A all show various side panels 54, 56 having rounded opposing ends and rounded upper edges. The side panels 54, 56 may have various other shapes and sizes depending on the application and the food item to be heated in the package 50.

As shown in FIGS. 12B, 13B, 14B, 15B, 16B, 17B, 18B, 19B, 20B and 21B of the drawings, the bottom panel 62 has an elongated rectangular shape. FIGS. 12B, 13B, 14B and 15B illustrate one version of the bottom panel 62 having two opposing rounded ends that extend outwardly from the side panels 54, 56. The bottom panel 62 may have various other shapes and sizes depending on the application and the food item to be heated in the package 50.

Figure 12A:
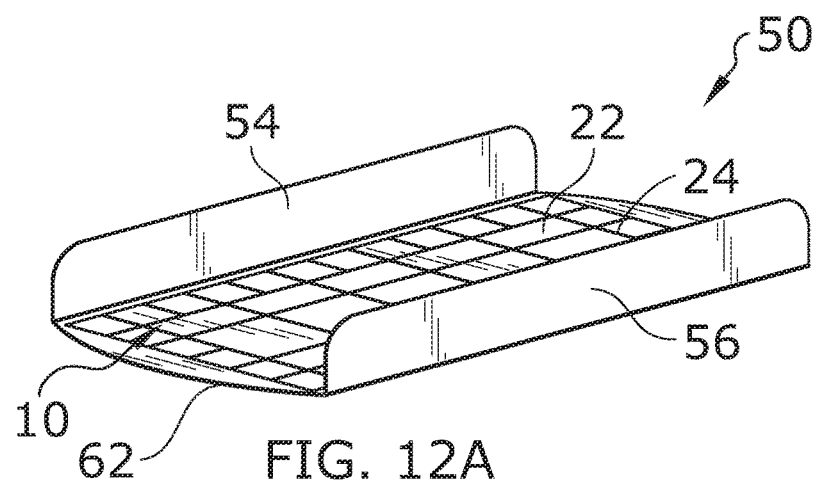
FIG. 12A illustrates an upper perspective view of a construct incorporating a biodegradable microwave susceptor in accordance with another example embodiment.
Figure 12B:
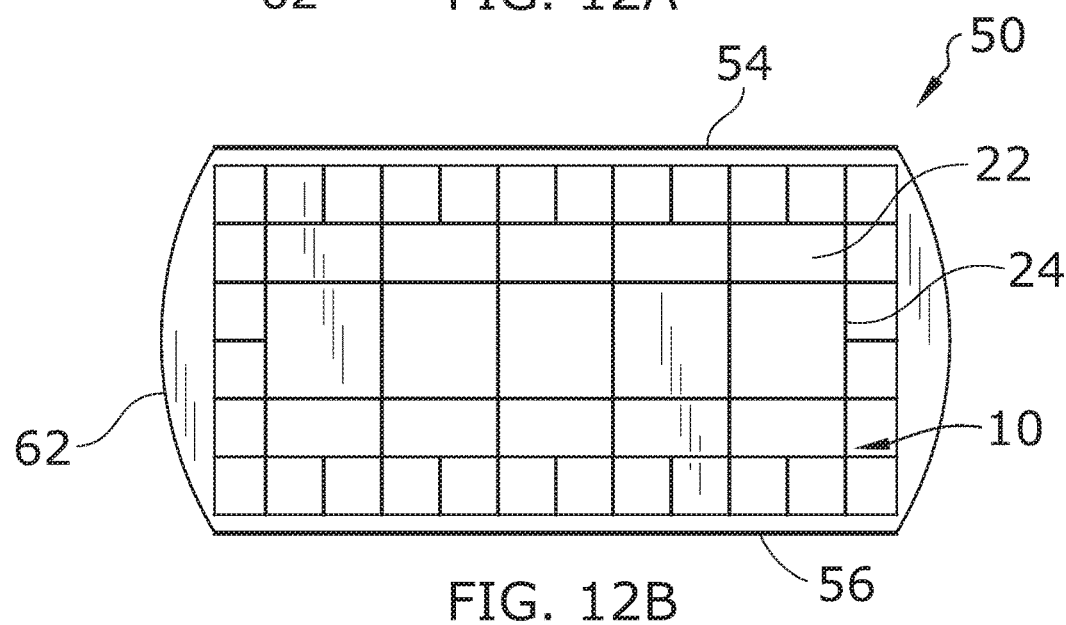
FIG. 12B is a top view of the construct incorporating the biodegradable microwave susceptor shown in FIG. 12A.
Figure 12C:
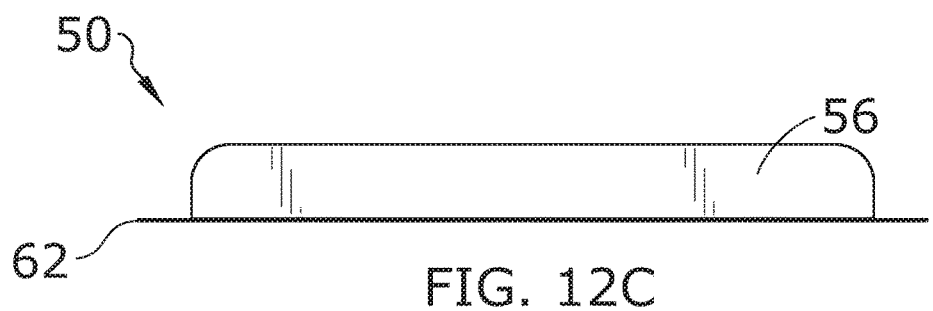
FIG. 12C is a side view of the construct incorporating the biodegradable microwave susceptor shown in FIG. 12A.
Figure 12D:
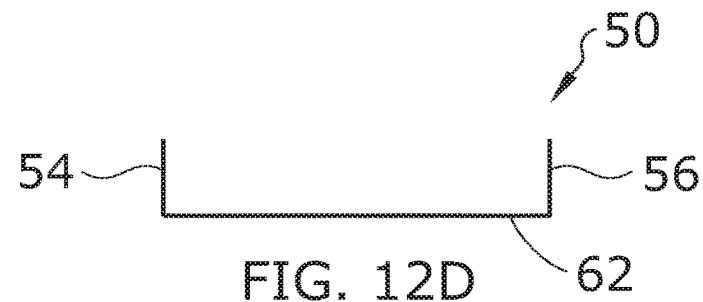
FIG. 12D is an end view of the construct incorporating the biodegradable microwave susceptor shown in FIG. 12A.
Figure 13A:
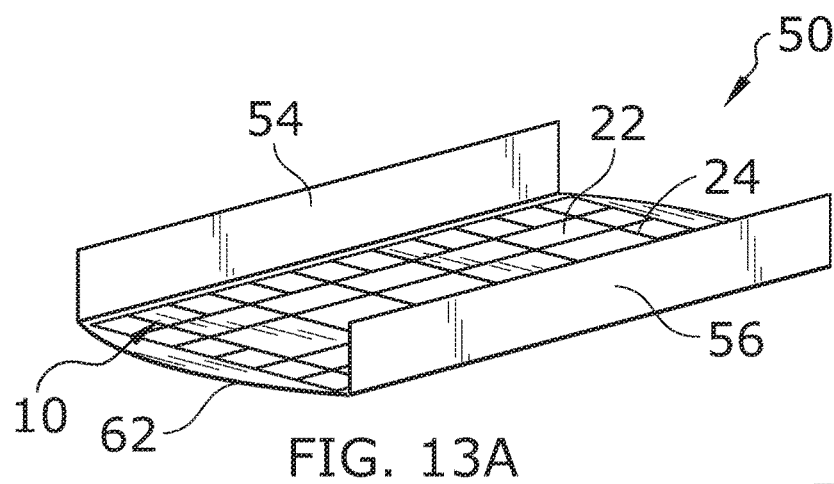
FIG. 13A illustrates an upper perspective view of a construct incorporating a biodegradable microwave susceptor in accordance with another example embodiment.
Figure 13B:
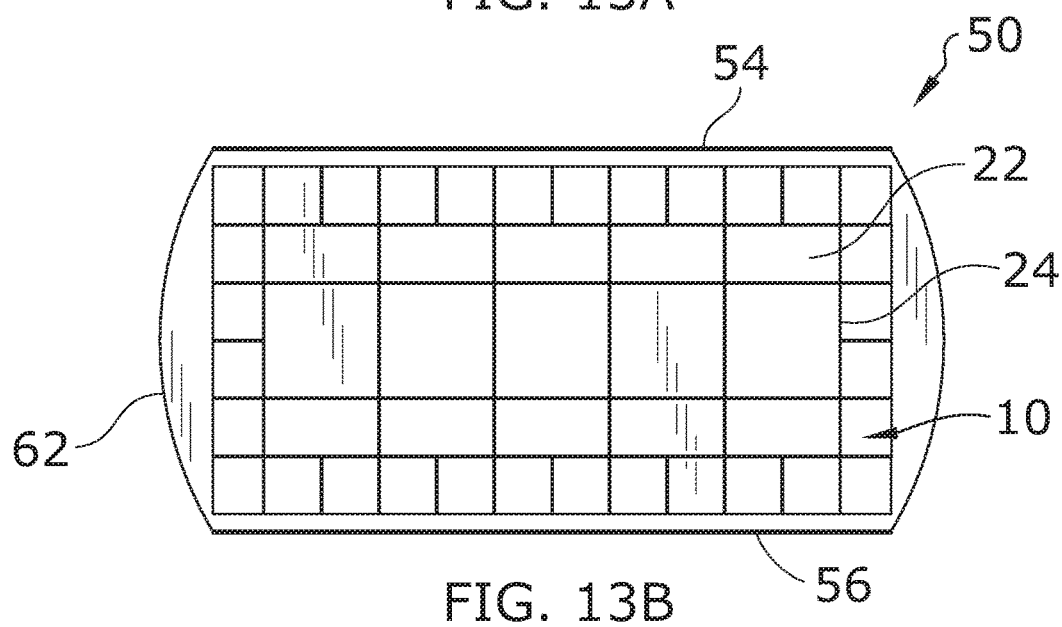
FIG. 13B is a top view of the construct incorporating the biodegradable microwave susceptor shown in FIG. 13A.
Figure 13C:
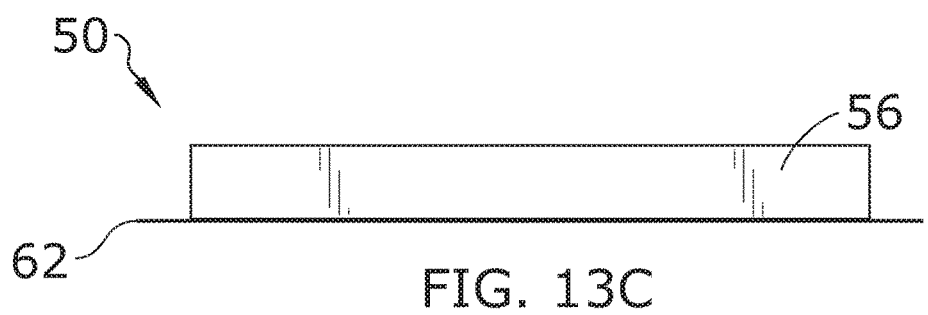
FIG. 13C is a side view of the construct incorporating the microwave biodegradable susceptor shown in FIG. 13A.
Figure 13D:
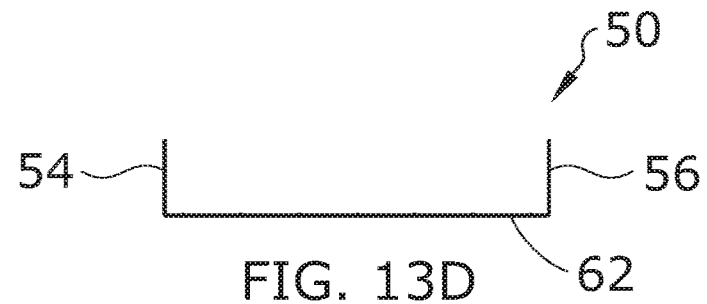
FIG. 13D is an end view of the construct incorporating the biodegradable susceptor shown in FIG. 13A.
Figure 14A:
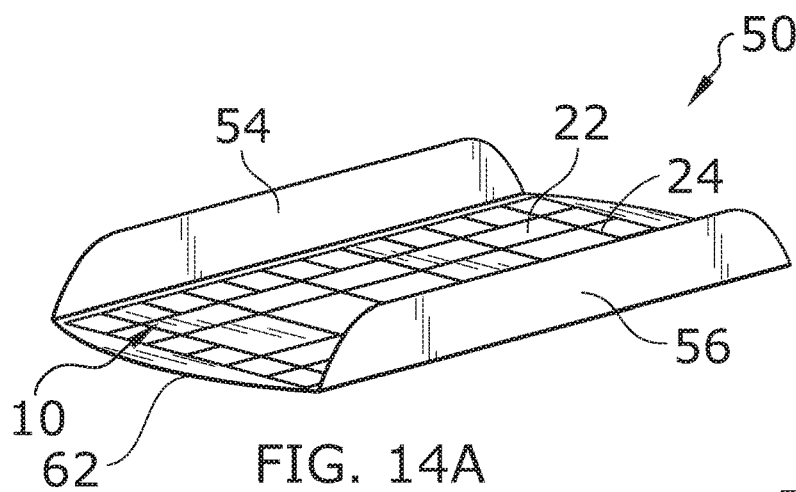
FIG. 14A illustrates an upper perspective view of a construct incorporating a biodegradable microwave susceptor in accordance with another example embodiment.
Figure 14B:
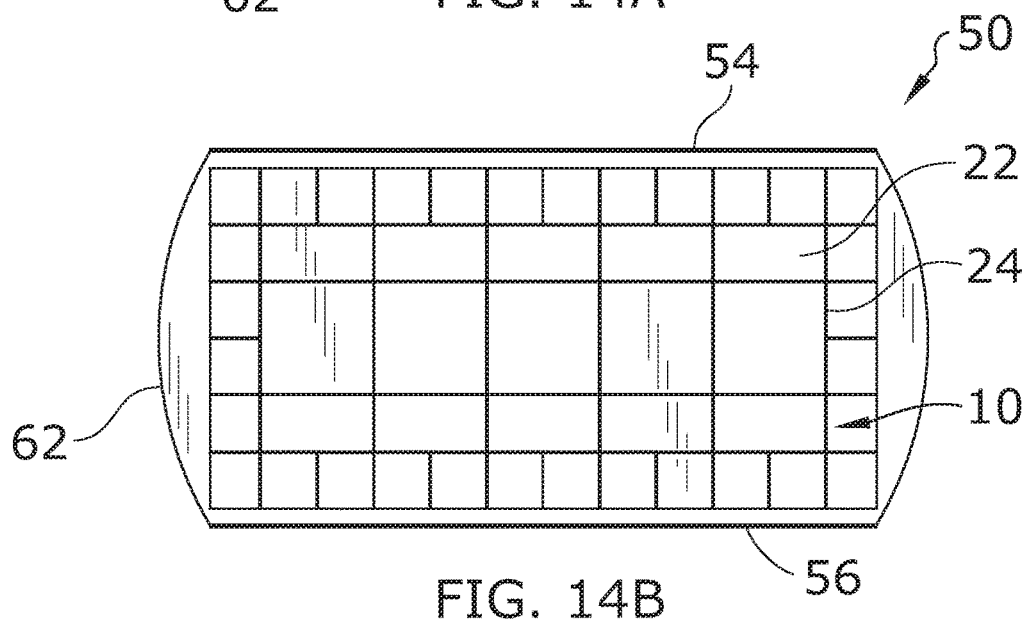
FIG. 14B is a top view of the construct incorporating the biodegradable microwave susceptor shown in FIG. 14A.
Figure 14C:
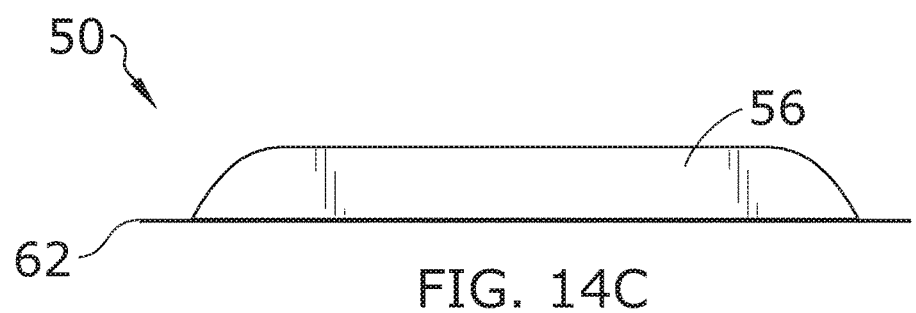
FIG. 14C is a side view of the construct incorporating the biodegradable microwave susceptor shown in FIG. 14A.
Figure 14D:
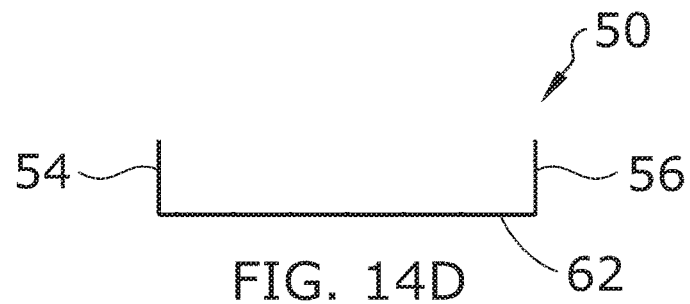
FIG. 14D is an end view of the construct incorporating the biodegradable microwave susceptor shown in FIG. 14A.
Figure 15A:
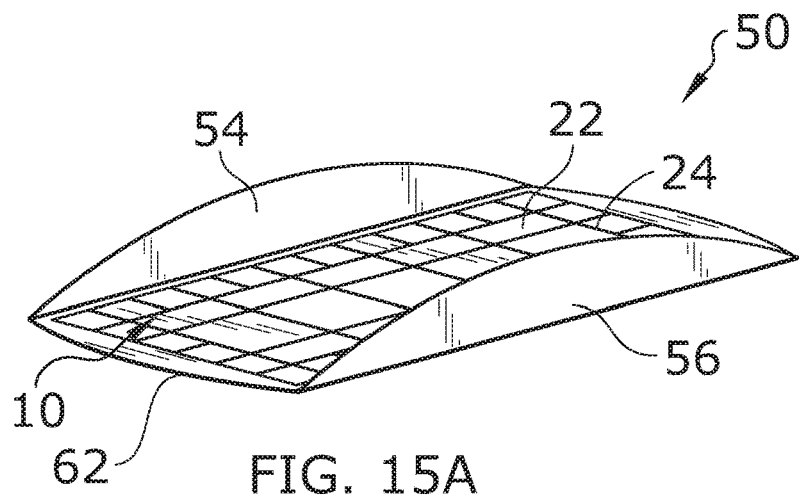
FIG. 15A illustrates an upper perspective view of a construct incorporating a biodegradable microwave susceptor in accordance with another example embodiment.
Figure 15B:
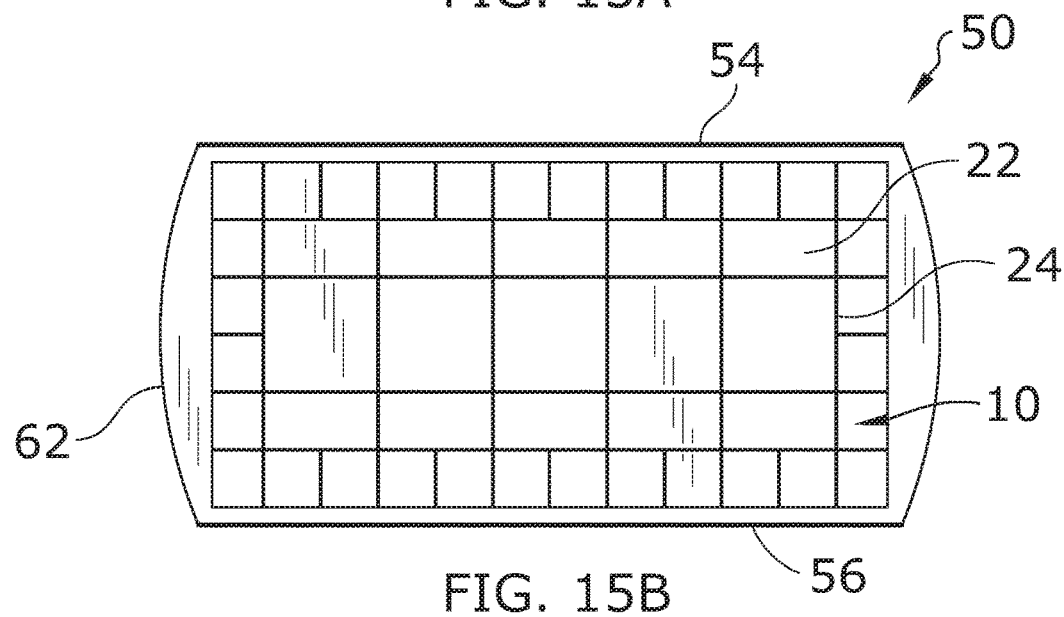
FIG. 15B is a top view of the construct incorporating the biodegradable microwave susceptor shown in FIG. 15A.
Figure 15C:
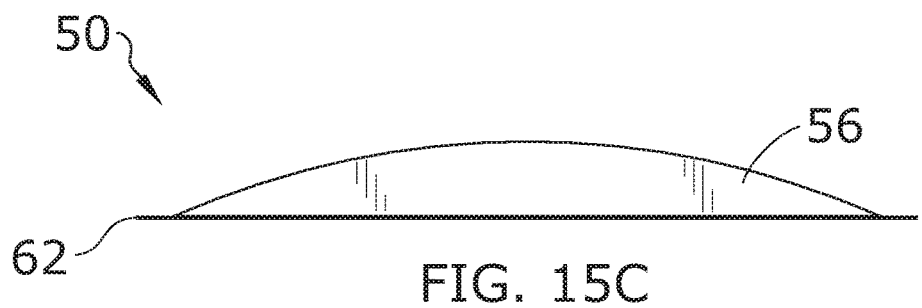
FIG. 15C is a side view of the construct incorporating the biodegradable microwave susceptor shown in FIG. 15A.
Figure 15D:
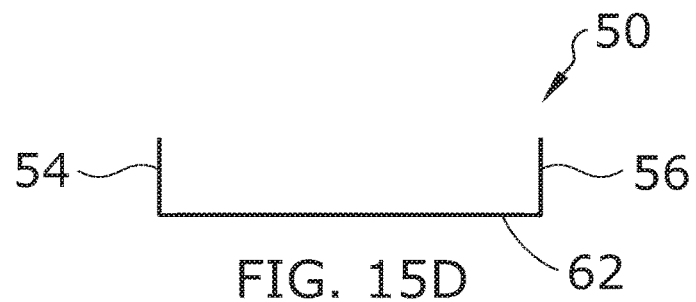
FIG. 15D is an end view of the construct incorporating the biodegradable microwave susceptor shown in FIG. 15A.
Figure 16A:
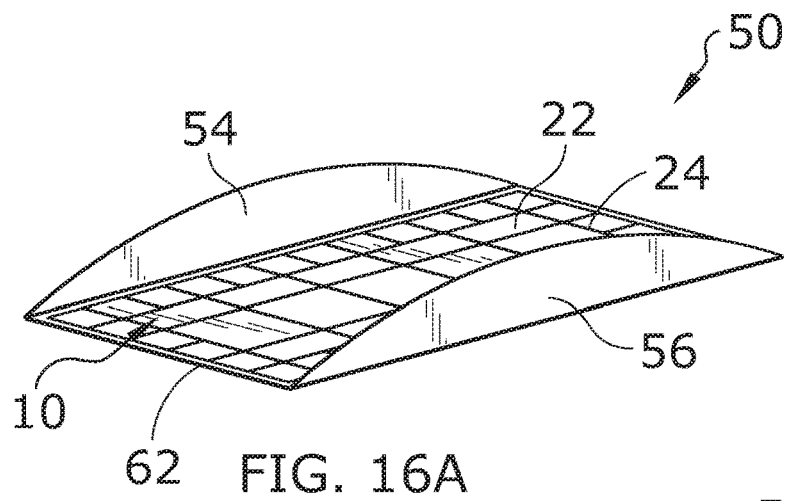
FIG. 16A illustrates an upper perspective view of a construct incorporating a biodegradable microwave susceptor in accordance with another example embodiment.
Figure 16B:
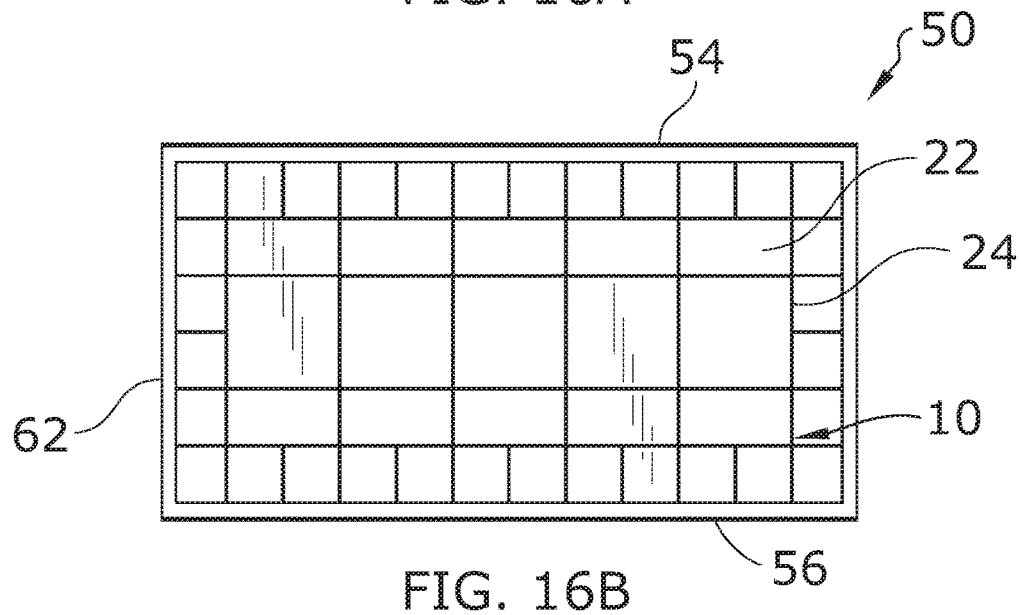
FIG. 16B is a top view of the construct incorporating the biodegradable microwave susceptor shown in FIG. 16A.
Figure 16C:
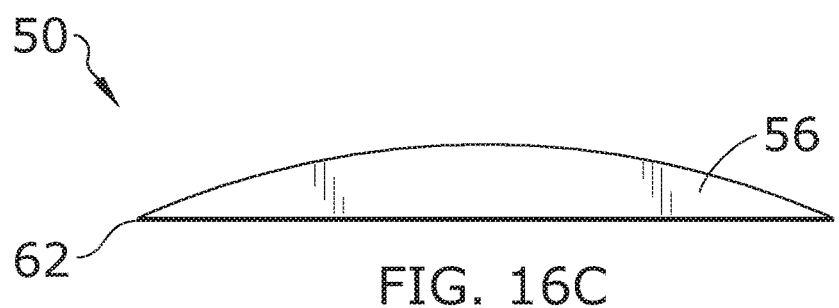
FIG. 16C is a side view of the construct incorporating the biodegradable microwave susceptor shown in FIG. 16A.
Figure 16D:
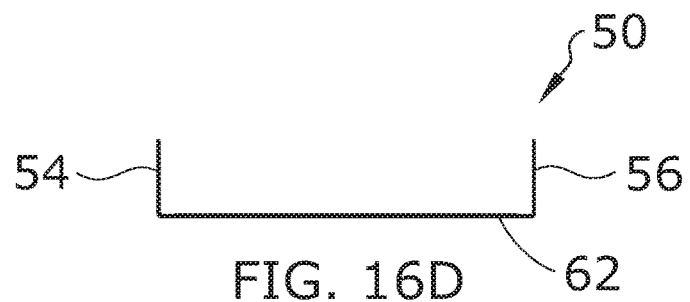
FIG. 16D is an end view of the construct incorporating the biodegradable microwave susceptor shown in FIG. 16A.
Figure 17A:
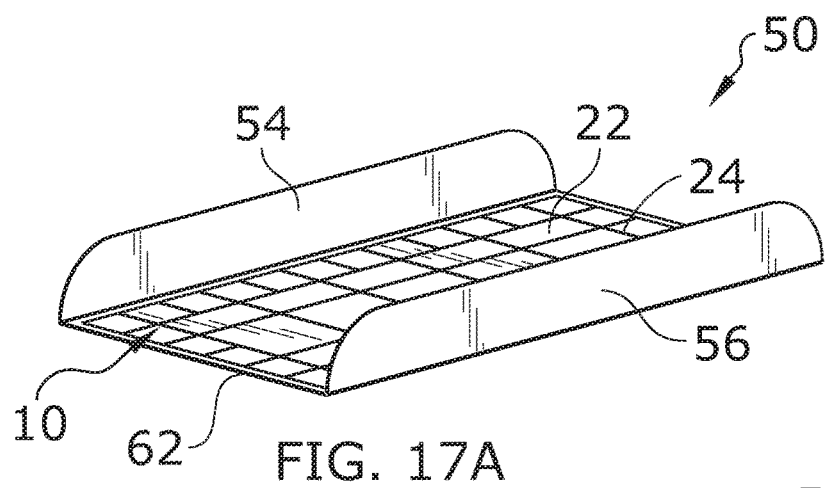
FIG. 17A illustrates an upper perspective view of a construct incorporating a biodegradable microwave susceptor in accordance with another example embodiment.
Figure 17B:
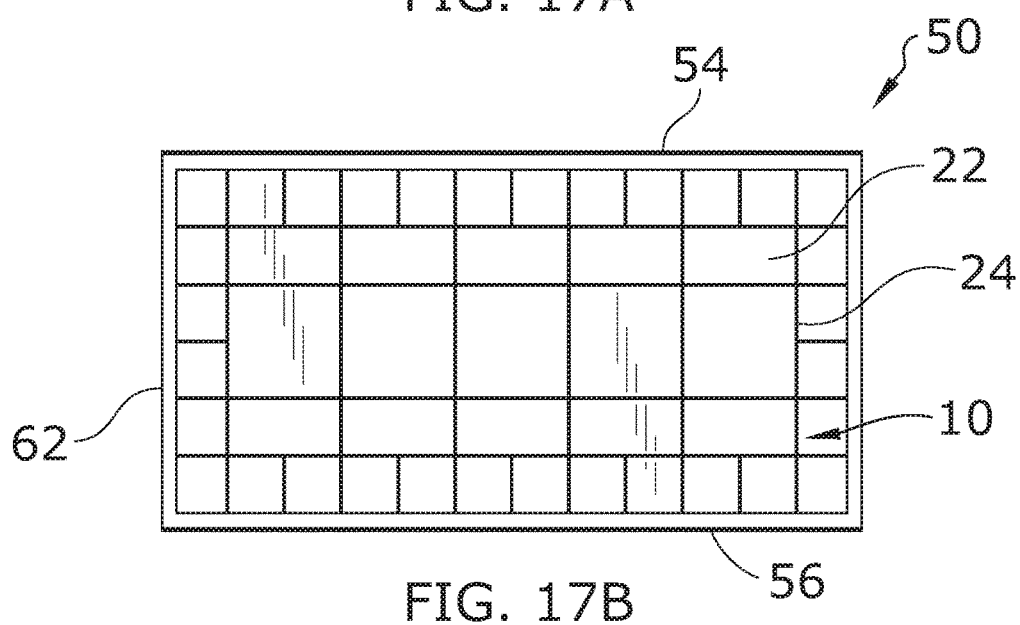
FIG. 17B is a top view of the construct incorporating the biodegradable microwave susceptor shown in FIG. 17A.
Figure 17C:
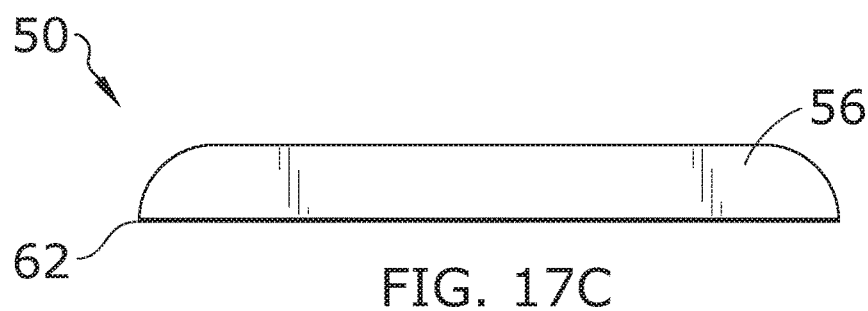
FIG. 17C is a side view of the construct incorporating the biodegradable microwave susceptor shown in FIG. 17A.
Figure 17D:
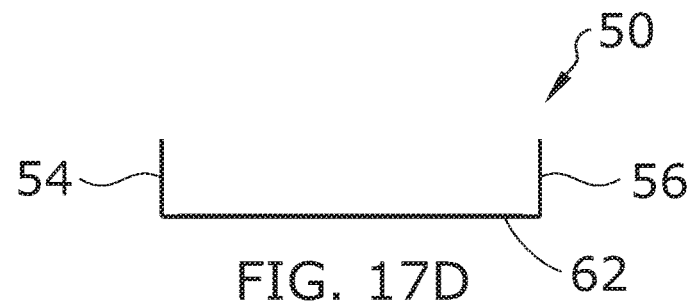
FIG. 17D is an end view of the construct incorporating the biodegradable microwave susceptor shown in FIG. 17A.
Figure 18A:
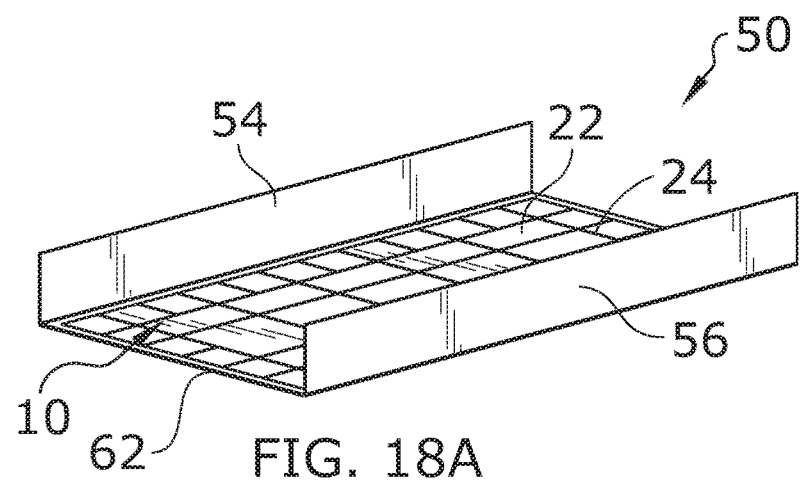
FIG. 18A illustrates an upper perspective view of a construct incorporating a biodegradable microwave susceptor in accordance with another example embodiment.
Figure 18B:
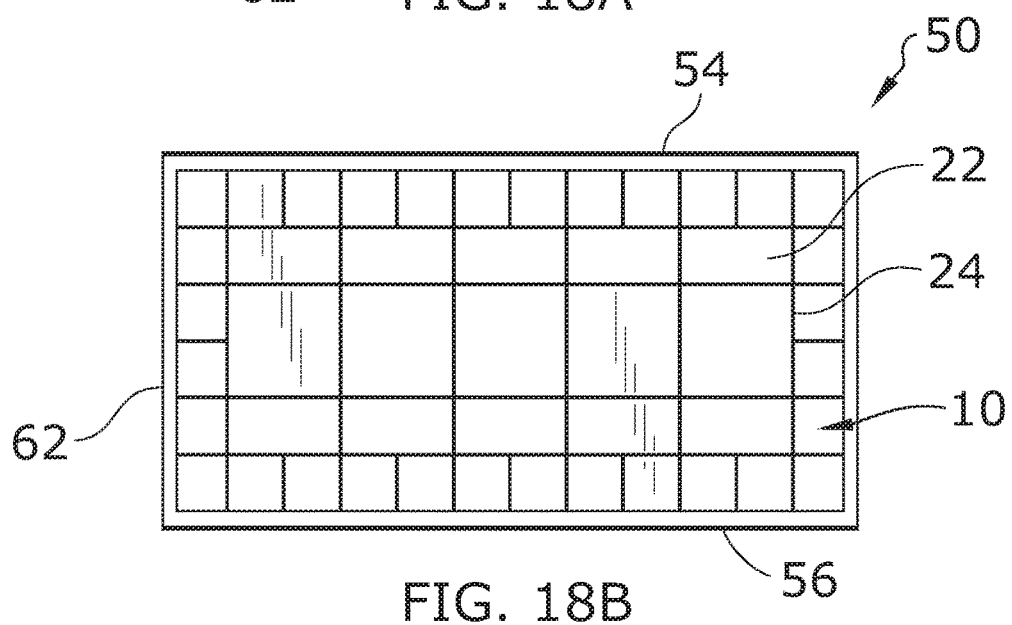
FIG. 18B is a top view of the construct incorporating the biodegradable microwave susceptor shown in FIG. 18A.
Figure 18C:
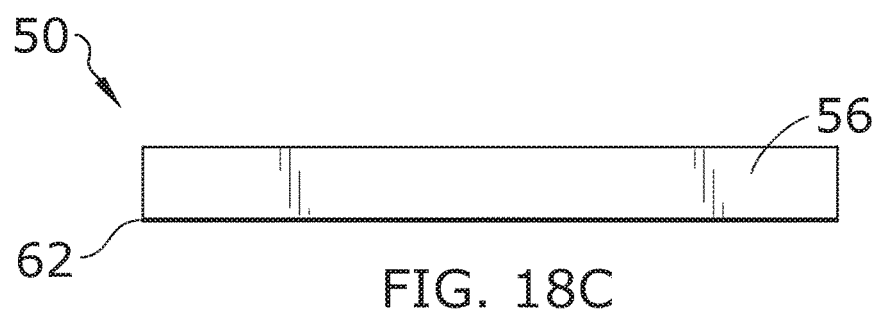
FIG. 18C is a side view of the construct incorporating the biodegradable microwave susceptor shown in FIG. 18A.
Figure 18D:
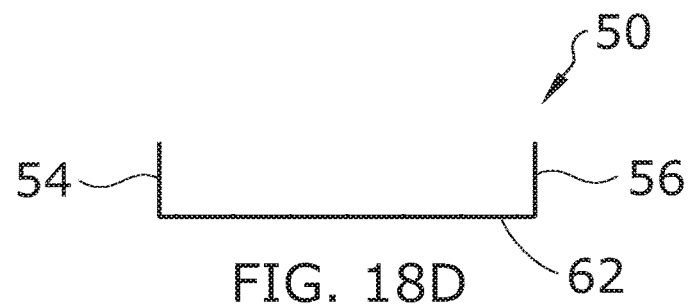
FIG. 18D is an end view of the construct incorporating the biodegradable microwave susceptor shown in FIG. 18A.
Figure 19A:
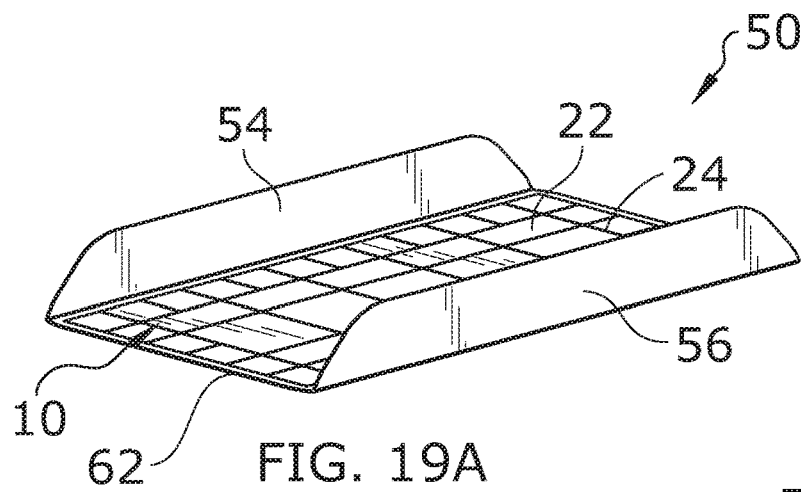
FIG. 19A illustrates an upper perspective view of a construct incorporating a biodegradable microwave susceptor in accordance with another example embodiment.
Figure 19B:
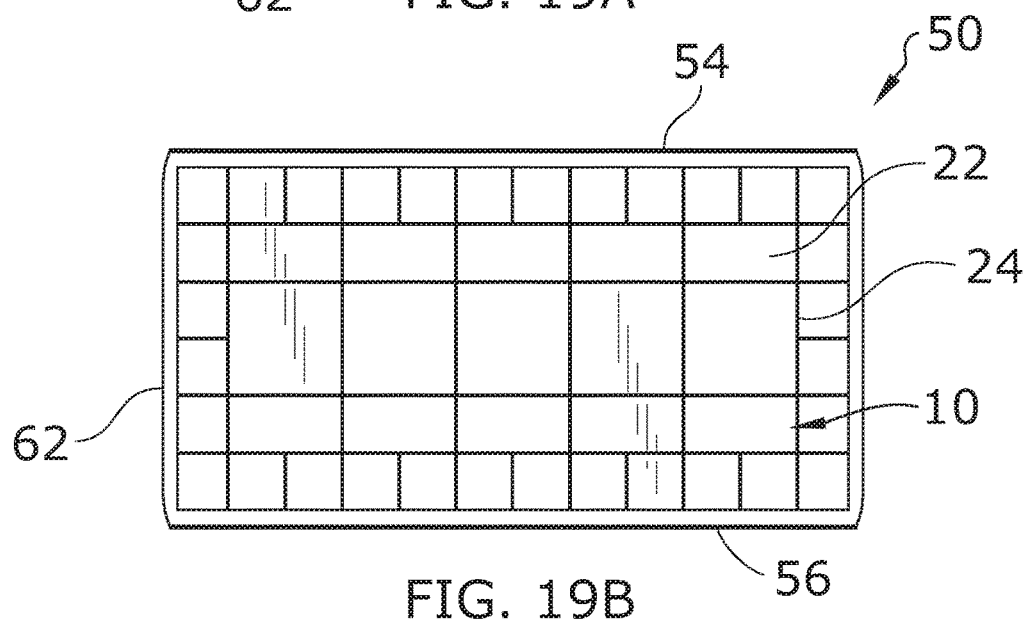
FIG. 19B is a top view of the construct incorporating the biodegradable microwave susceptor shown in FIG. 19A.
Figure 19C:
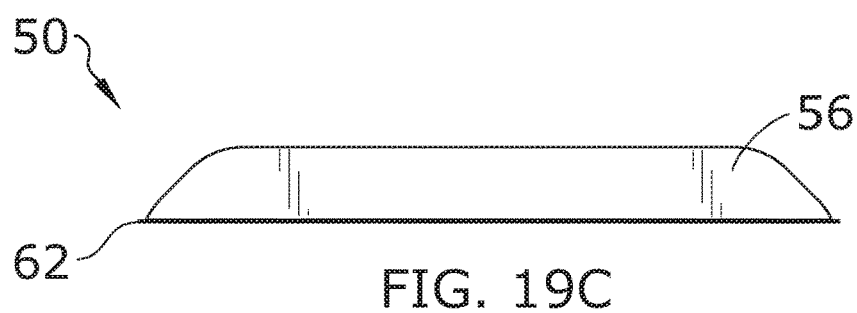
FIG. 19C is a side view of the construct incorporating the biodegradable microwave susceptor shown in FIG. 19A.
Figure 19D:
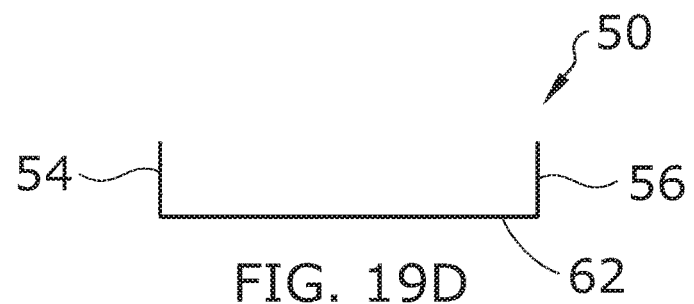
FIG. 19D is an end view of the construct incorporating the biodegradable microwave susceptor shown in FIG. 19A.
Figure 20A:
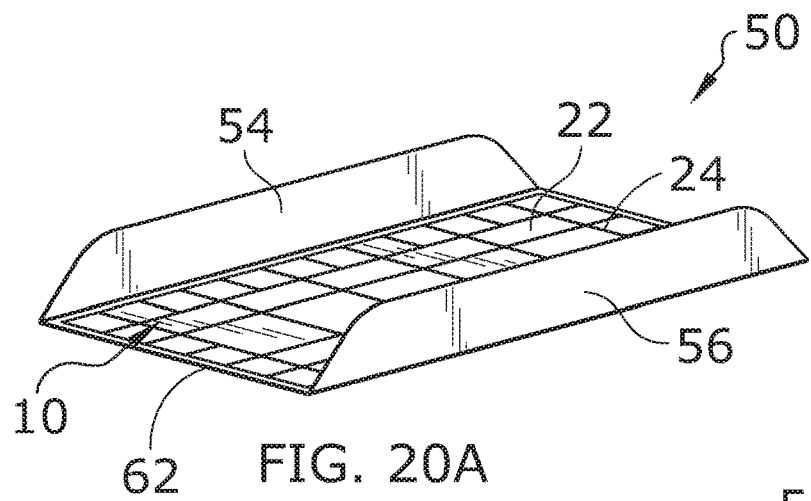
FIG. 20A illustrates an upper perspective view of a construct incorporating a biodegradable microwave susceptor in accordance with another example embodiment.
Figure 20B:
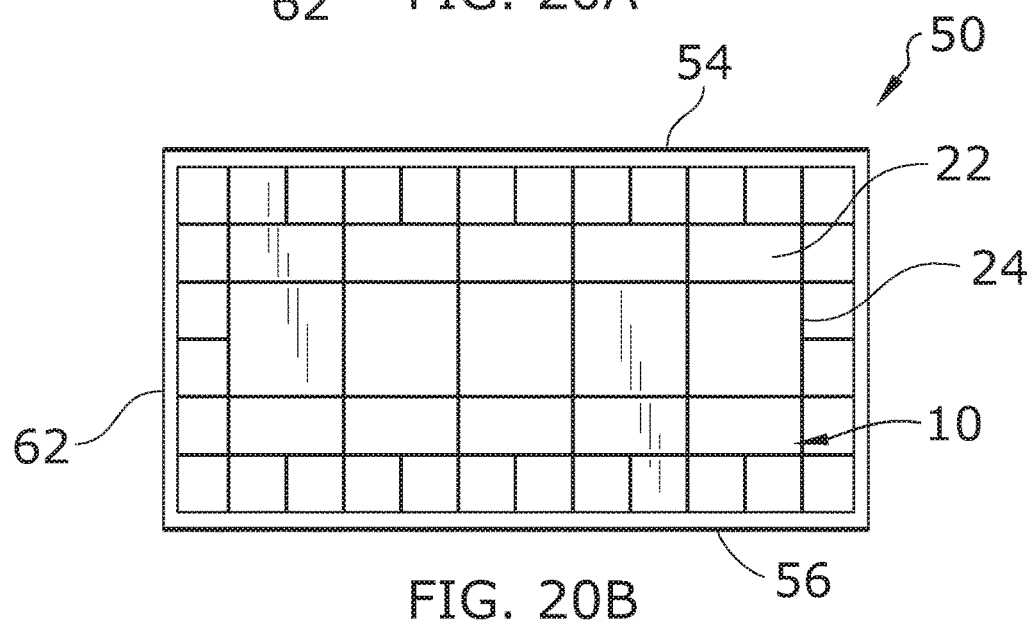
FIG. 20B is a top view of the construct incorporating the biodegradable microwave susceptor shown in FIG. 20A.
Figure 20C:
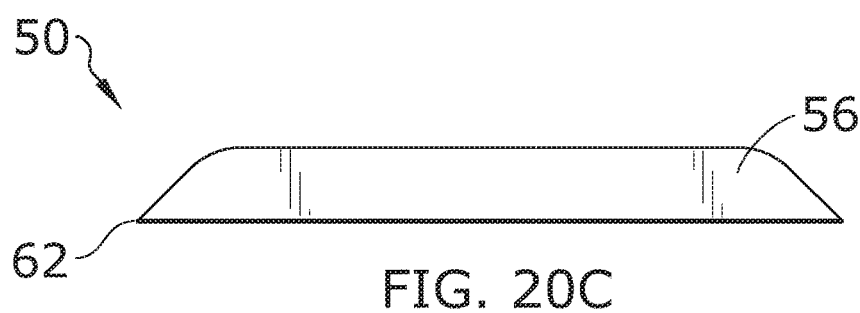
FIG. 20C is a side view of the construct incorporating the biodegradable microwave susceptor shown in FIG. 20A.
Figure 20D:
FIG. 20D is an end view of the construct incorporating the biodegradable microwave susceptor shown in FIG. 20A.
Figure 21A:
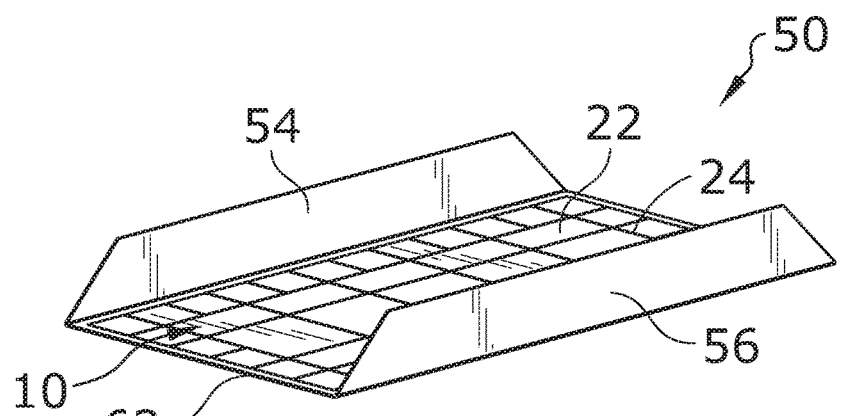
FIG. 21A illustrates an upper perspective view of a construct incorporating a biodegradable microwave susceptor in accordance with another example embodiment.
Figure 21B:
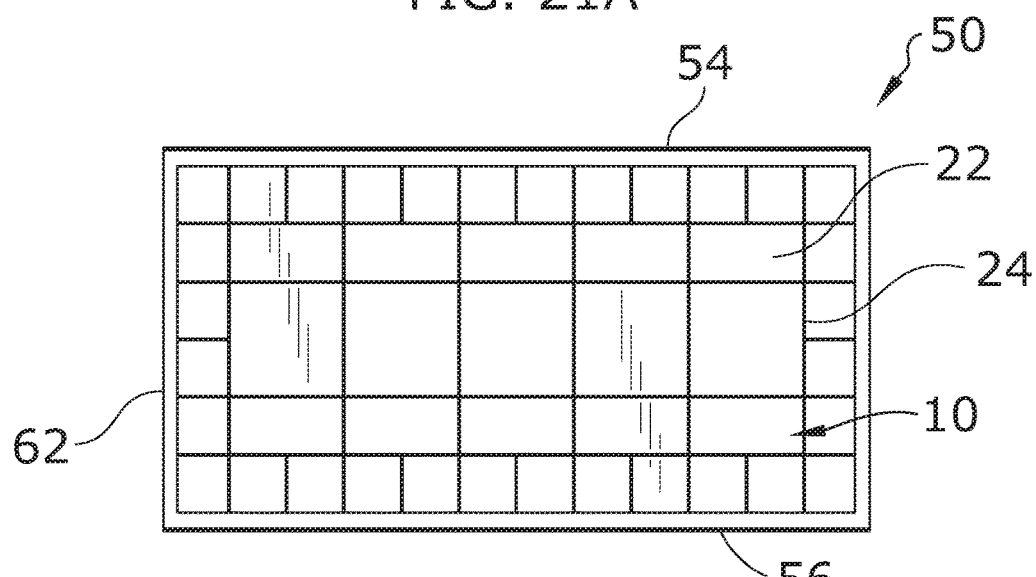
FIG. 21B is a top view of the construct incorporating the biodegradable microwave susceptor shown in FIG. 21A.
Figure 21C:
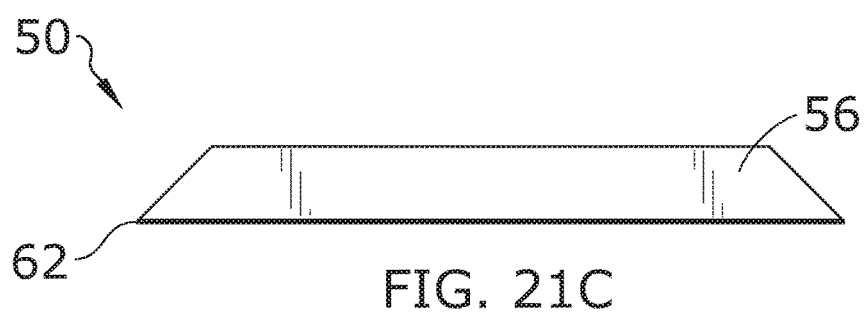
FIG. 21C is a side view of the construct incorporating the biodegradable microwave susceptor shown in FIG. 21A.
Figure 21D:
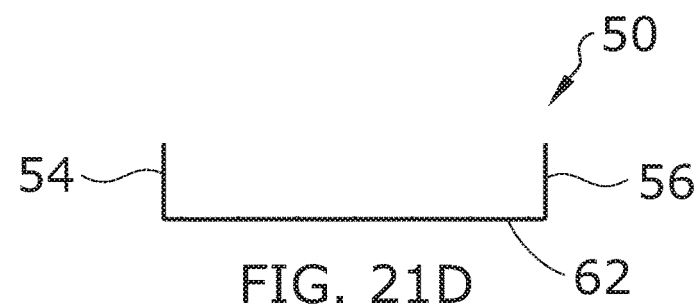
FIG. 21D is an end view of the construct incorporating the biodegradable microwave susceptor shown in FIG. 21A.

As further shown in FIGS. 12B, 13B, 14B, 15B, 16B, 17B, 18B, 19B, 20B and 21B of the drawings, a plurality of areas of microwave interactive material 22 are formed with microwave inactive areas 24 between them. As shown in FIG. 12B, the areas of microwave interactive material 22 and the microwave inactive areas 24 may be arranged to form a grid-like pattern. As further shown in FIG. 12B, some or all of the areas of microwave interactive material 22 extending around the perimeter of the bottom panel 62 may have a smaller square shape than interior areas of microwave interactive material 22. As further shown in FIG. 12B of the drawings, a plurality of middle areas of microwave interactive material 22 may extend longitudinally in two opposing rows along the side portions with each having an elongated rectangular shape extending longitudinally with the construct 50. As further shown in FIG. 12B, some or all of the interior areas of microwave interactive material 22 may have a larger square shape with the plurality of interior areas of microwave interactive material 22 extending longitudinally in a row within the construct 50. The areas of microwave interactive material 22 may have various other shapes, patterns and sizes depending on the application and the food item to be heated in the construct 50.

G. Operation of Embodiments.

In use, a food item to be heated may be placed in the space 68 of the example sleeve of construct 50 of FIGS. 3-9 or the open tray of the variation of construct 50 of FIGS. 12A-21D, or placed on or in proximity to the flat surface of the construct 80 of FIGS. 10-11. The construct with the food item to be heated may be placed in a suitable microwave oven and the microwave oven activated for a period of time suitable to heat the food item as desired or necessary. While the microwave oven is activated, the electromagnetic energy of the microwaves is absorbed by the biodegradable microwave susceptor 10 incorporated in the construct and converted to heat. Depending on whether the food item being heated is in contact with the surface of the susceptor 10 or there is an air gap between the surface of the susceptor 10 and the surface of the food item, the susceptor 10 will heat the food item by conduction, infrared radiation or a combination of both. Upon completion of the heating process, the food item may be removed from the construct, and the construct may be properly disposed of.

Unless otherwise defined, all technical and scientific terms used herein have the same meaning as commonly understood by one of ordinary skill in the art to which this invention belongs. Although methods and materials similar to or equivalent to those described herein can be used in the practice or testing of the biodegradable susceptor, suitable methods and materials are described above. All publications, patent applications, patents, and other references mentioned herein are incorporated by reference in their entirety to the extent allowed by applicable law and regulations. The biodegradable microwave susceptor may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A construct for heating a food item in a microwave oven, comprising:
   a bottom panel having a first longitudinal edge, a second longitudinal edge opposite of the first longitudinal edge, an inner surface and an outer surface;
   a first side panel extending upwardly from the first longitudinal edge of the bottom panel, the first side panel having an inner surface and an outer surface; and
   a second side panel extending upwardly from the second longitudinal edge of the bottom panel, the second side panel having an inner surface and an outer surface;
   the bottom panel, the first side panel and the second side panel form a U-shaped tray with at least one open end defining an interior space for receiving the food item;
   at least one fold area between the bottom panel and the first side panel or the second side panel;
   the inner surface of the bottom panel includes a microwave susceptor comprising:
      a biodegradable substrate comprised of a biodegradable thin film; and
      a susceptor layer on the biodegradable substrate, the susceptor layer comprising a pattern of metallized material corresponding to a selected pattern of heat to be applied to the food item within the construct, wherein the pattern of metallized material includes at least one demetallized area corresponding to the at least one fold area.

2. The construct of claim 1, wherein the biodegradable substrate is comprised of a cellulose material.

3. The construct of claim 2, wherein the biodegradable substrate is comprised of cellophane.

4. The construct of claim 1, wherein the biodegradable substrate is comprised of biodegradable polyester.

5. The construct of claim 1, wherein the pattern of metallized material includes at least one selected demetallized area exposing an area of the bottom panel configured to be in contact with the selected portion of the food item.

6. The construct of claim 1, including a top panel having a first longitudinal edge, a second longitudinal edge, an inner surface and an outer surface, wherein the first side panel and the second side panel each extend between the bottom panel and the top panel in a vertical manner.

7. The construct of claim 6, wherein the microwave susceptor is present on the inner surfaces of each of the top panel, the bottom panel, the first side panel and the second side panel.

8. The construct of claim 7, wherein at least one of the top panel and the bottom panel is comprised of a first section and a second section having an overlap area configured to overlie and be connected to at least a portion of the first section to form the top panel or the bottom panel.

9. The construct of claim 8, wherein the pattern of metallized material includes at least one selected demetallized area exposing an area of the bottom panel configured to be in contact with the selected portion of the food item, and wherein the pattern of metallized material includes at least one demetallized area corresponding to the overlap area.

10. The construct of claim 1, wherein the pattern of metallized material includes a first pattern having a first size and a second pattern having a second size different from the first size, the first pattern and the second pattern are selectively located in a first area and a second area of the microwave susceptor configured to correspondingly be in contact with a first portion and a second portion of the food item.

11. A construct for heating a food item in a microwave oven, comprising:
a plurality of panels arranged to define a space for the food item, wherein at least one panel of the plurality of panels has a surface exposed at least partially to the space, wherein the surface includes a microwave susceptor;
wherein the microwave susceptor comprises:
a biodegradable substrate comprised of a biodegradable thin film; and
a susceptor layer on the biodegradable substrate, the susceptor layer comprising a pattern of metallized material corresponding to a selected pattern of heat to be applied to the food item within the construct; and
wherein the construct includes at least one fold area and the pattern of metallized material includes at least one demetallized area corresponding to the at least one fold area.

12. The construct of claim 11, wherein the biodegradable substrate is comprised of a cellulose material.

13. The construct of claim 12, wherein the biodegradable substrate is comprised of cellophane.

14. The construct of claim 11, wherein the biodegradable substrate is comprised of biodegradable polyester.

15. The construct of claim 11, wherein the pattern of metallized material includes at least one selected demetallized area exposing an area of the at least one panel configured to be in contact with a selected portion of the food item.

16. The construct of claim 11, wherein each panel of the plurality of panels has a surface exposed at least partially to the space, and wherein each surface includes the microwave susceptor.

17. The construct of claim 11, wherein the pattern of metallized material includes a first pattern having a first size and a second pattern having a second size different from the first size, and wherein the first pattern and the second pattern are selectively located in a first area and a second area of the microwave susceptor configured to correspondingly be in contact with a first portion and a second portion of the food item.

18. The construct of claim 17, wherein at least first and second panels of the plurality of panels each have a surface exposed at least partially to the space, and wherein the first pattern is included on the surface of the first panel and the second pattern is included on the surface of the second panel.

19. A construct for heating a food item in a microwave oven, comprising:
a bottom panel having a first longitudinal edge, a second longitudinal edge opposite of the first longitudinal edge, an inner surface and an outer surface, wherein the inner surface is comprised of a first portion that is adapted to be in contact with the food item;
a first side panel extending upwardly from the first longitudinal edge of the bottom panel, the first side panel having an inner surface and an outer surface; and
a second side panel extending upwardly from the second longitudinal edge of the bottom panel, the second side panel having an inner surface and an outer surface;
the bottom panel, the first side panel and the second side panel form a U-shaped tray with at least one open end defining an interior space for receiving the food item;
a thin film of a biodegradable cellulose-based material; and
a susceptor layer positioned between the inner surface of the bottom panel and the biodegradable substrate, wherein the susceptor layer has a pattern;
wherein the pattern of the susceptor layer comprises a plurality of microwave interactive areas isolated from each other by a plurality of microwave inactive areas, wherein the plurality of microwave interactive areas are each comprised of a microwave interactive material, wherein the microwave interactive material is comprised of a metallized material, and wherein each of the plurality of microwave inactive areas are devoid of microwave interactive material;
wherein the pattern of the susceptor layer is selected to prevent scorching and burning of the biodegradable substrate.

20. The construct of claim 19, wherein the pattern is comprised of a grid-like pattern.

* * * * *